United States Patent
Sakai et al.

(10) Patent No.: US 12,103,586 B2
(45) Date of Patent: Oct. 1, 2024

(54) POSITION ESTIMATION APPARATUS

(71) Applicant: FAURECIA CLARION ELECTRONICS CO., LTD., Saitama (JP)

(72) Inventors: Takahiro Sakai, Tokyo (JP); Morihiko Sakano, Tokyo (JP); Daisuke Fukuda, Saitama (JP); Junya Murayama, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 676 days.

(21) Appl. No.: 17/280,830

(22) PCT Filed: Mar. 13, 2019

(86) PCT No.: PCT/JP2019/010421
§ 371 (c)(1),
(2) Date: Mar. 26, 2021

(87) PCT Pub. No.: WO2020/066069
PCT Pub. Date: Apr. 2, 2020

(65) Prior Publication Data
US 2022/0009552 A1 Jan. 13, 2022

(30) Foreign Application Priority Data
Sep. 26, 2018 (JP) ................ 2018-180913

(51) Int. Cl.
*B62D 15/02* (2006.01)
*G01C 21/36* (2006.01)
(Continued)

(52) U.S. Cl.
CPC ..... *B62D 15/0285* (2013.01); *G01C 21/3602* (2013.01); *G06T 7/73* (2017.01);
(Continued)

(58) Field of Classification Search
CPC ............ B62D 15/0285; G01C 21/3602; G01C 21/3407; G06T 7/73; G06T 2207/10016;
(Continued)

(56) References Cited

U.S. PATENT DOCUMENTS

| 2004/0167670 A1* | 8/2004 | Goncalves | ............. G01C 21/12 |
| 2010/0027844 A1* | 2/2010 | Akita | ...................... G06T 7/269 |

(Continued)

FOREIGN PATENT DOCUMENTS

| JP | 2010-89716 A | 4/2010 |
| JP | 2014-142241 A | 8/2014 |

(Continued)

OTHER PUBLICATIONS

Search Report issued by the European Patent Office for application EP 19864740.6 on Aug. 8, 2022; 8 pages.
(Continued)

*Primary Examiner* — Elaine Gort
*Assistant Examiner* — Ellis B. Ramirez
(74) *Attorney, Agent, or Firm* — REISING ETHINGTON P.C.

(57) ABSTRACT

A position estimation apparatus includes: an image information calculation unit that extracts each of image feature points from a plurality of images which are sequentially captured and associates the image feature points with each other between the plurality of images; a travel amount calculation unit that estimates the position of the mobile object; a three-dimensional image feature point calculation unit that estimates a three-dimensional position of the image feature point in a real space on the basis of a result of associating the image feature points with each other and the position of the mobile object; a position correction unit that corrects the three-dimensional position and the position of the mobile object so as to reduce a position error between a (Continued)

position of the three-dimensional position, when the three-dimensional position is reprojected onto any one of the plurality of images, in the relevant image and the image feature point; a route regeneration judgment unit that judges whether or not to regenerate the route on the basis of a result of comparison between the corrected position of the mobile object and the route.

6 Claims, 19 Drawing Sheets

(51) Int. Cl.
| | | |
|---|---|---|
| *G06T 7/73* | (2017.01) | |
| *G06V 10/44* | (2022.01) | |
| *G06V 10/46* | (2022.01) | |
| *G06V 20/58* | (2022.01) | |

(52) U.S. Cl.
CPC ............ *G06V 10/44* (2022.01); *G06V 10/462* (2022.01); *G06V 20/586* (2022.01); *G06T 2207/10016* (2013.01); *G06T 2207/30232* (2013.01)

(58) Field of Classification Search
CPC . G06T 2207/30232; G06T 2207/30241; G06T 2207/30244; G06T 2207/30264; G06T 7/246; G06V 10/44; G06V 10/462; G06V 20/586
USPC ...................................... 701/41, 70
See application file for complete search history.

(56) References Cited

U.S. PATENT DOCUMENTS

| | | | | |
|---|---|---|---|---|
| 2015/0158527 A1* | 6/2015 | Hafner | ................... | B60D 1/245 |
| 2015/0213617 A1* | 7/2015 | Kim | ....................... | H04N 23/57 |
| 2017/0176997 A1* | 6/2017 | Narikawa | ............ | G05D 1/0088 |
| 2018/0114339 A1 | 4/2018 | Ikeda et al. | | |
| 2018/0173059 A1 | 6/2018 | Kawase et al. | | |
| 2018/0246515 A1* | 8/2018 | Iwama | .................... | B60R 1/002 |
| 2018/0307922 A1* | 10/2018 | Yoon | ....................... | G06T 7/174 |
| 2018/0308364 A1* | 10/2018 | Kume | ..................... | B60R 21/00 |
| 2019/0220997 A1* | 7/2019 | Asai | .................... | G01C 21/3822 |
| 2019/0291721 A1* | 9/2019 | Sakano | .................. | G06V 20/64 |
| 2020/0317268 A1* | 10/2020 | Sugae | ................ | B62D 15/0285 |
| 2020/0369262 A1* | 11/2020 | Suzuki | ................ | G06V 20/586 |

FOREIGN PATENT DOCUMENTS

| | | | |
|---|---|---|---|
| JP | 2015-153321 A | | 8/2015 |
| JP | 2017-111606 A | | 6/2017 |
| JP | 2019089476 A | * | 6/2019 |
| WO | WO 2004/059900 A2 | | 7/2004 |
| WO | WO 2016/208404 A1 | | 12/2016 |
| WO | WO 2016/208484 A1 | | 12/2016 |

OTHER PUBLICATIONS

Extended European Search Report dated Jun. 13, 2022 for corresponding European Application No. 19864740.6 (8 pages).
Japanese Reason of Rejection dated Jul. 26, 2022 regarding Japanese Patent Application No. 2018-180913 counterpart to U.S. Appl. No. 17/280,830 (3 pages) with English Translation (3 pages).
International Search Report and Written Opinion of PCT/JP2019/010421, dated Jun. 18, 2019, w/English translation, 17 pages.
Takafumi Aoki et al., "New developments in 3D image sensing—From element technology for real-time and high-precision applications to industrial applications," NTS Inc. 2015, pp. 125-137, 3.2.3 "Optimizing camera parameters by bundle adjustment" w/English abstract.
Japanese Office Action dated Feb. 22, 2022 regarding Japanese Patent Application No. 2018-180913 corresponding to U.S. Patent Application No. 17/280,83012—(4 pages) with English Translation (5 pages).

* cited by examiner

POSITION ESTIMATION APPARATUS

CROSS-REFERENCE TO RELATED APPLICATION(S)

This application is a U.S. National Phase Patent Application of International Application Number PCT/JP2019/010421, filed on Mar. 13, 2019, which claims priority of Japanese Patent Application Number 2018-180913, filed on Sep. 26, 2018, the entire content of each of which is incorporated herein by reference.

TECHNICAL FIELD

The present invention relates to a position estimation apparatus.

BACKGROUND ART

An automatic parking system(s) for designating a parking position of an automobile, setting a route to the parking position, and causing the automobile to move autonomously without driving operation by a driver has been proposed. Such an automatic parking system is required to estimate the position of the running automobile with high accuracy in order to cause the automobile to move accurately autonomously according to the route to the parking position.

Regarding the estimation of the position of the running automobile, technology described in PTL 1 mentioned below is known PTL 1 discloses a three-dimensional position estimation apparatus for estimating an actual position indicating a position(s) of a feature point(s), which exists in a captured image, in a real space on the basis of a plurality of captured images sequentially captured by an image capturing unit which moves along with movements of a mobile object, wherein the three-dimensional position estimation apparatus includes: a feature point associating means that extracts each of one or a plurality of feature points in the plurality of captured images and associates the feature points with each other between the plurality of captured images; a behavior information acquisition means that acquires behavior information regarding behaviors of the mobile object, a travel amount calculation means that calculates a mobile object travel amount indicating a travel amount of the mobile object while capturing the plurality of captured images on the basis of the behavior information; and an actual position estimation means that estimates the actual position on the basis of a travel amount of the feature point(s) and the mobile object travel amount between the plurality of captured images.

CITATION LIST

Patent Literature

PTL 1 Japanese Patent Application Laid-Open (Kokai) Publication No. 2014-142241

SUMMARY OF THE INVENTION

Problems to be Solved by the Invention

With the automatic parking system, a complicated route including a plurality of number of times of steering wheel turns to switch between forward and reverse movements may sometimes be set according to, for example, a positional relationship between the parking position and surrounding obstacles. However, if the technology disclosed by PTL 1 is applied to the automatic parking system, it is impossible to check whether or not the automobile is moving accurately according to the route; and, therefore, position estimation errors will be accumulated while running along the complicated route and it becomes difficult to move accurately autonomously. Accordingly, there is some room for improvement regarding the accuracy in estimating the position of the mobile object which moves autonomously along the route.

Means to Solve the Problems

A position estimation apparatus according to the present invention is to estimate a position of a mobile object moving along a preset route and includes, an image information calculation unit that extracts each of image feature points from a plurality of images which are sequentially captured by an image capturing unit mounted in the mobile object and associates the image feature points with each other between the plurality of images, a travel amount calculation unit that estimates the position of the mobile object by calculating a travel amount of the mobile object; a three-dimensional image feature point calculation unit that estimates a three-dimensional position of the image feature point in a real space on the basis of a result of associating the image feature points with each other between the plurality of images and the position of the mobile object estimated by the travel amount calculation unit, a position-in-route judgement unit that judges whether or not the mobile object has reached a preset spot on the route; a position correction unit that, if the position-in-route judgement unit determines that the mobile object has reached the spot, calculates a position error between a position of the three-dimensional position, when the three-dimensional position is reprojected onto any one of the plurality of images, in the relevant image and the image feature point extracted from the relevant image and corrects the three-dimensional position and the position of the mobile object so as to reduce the position error; and a route regeneration judgment unit that compares the position of the mobile object corrected by the position correction unit with the route and judges whether or not to regenerate the route on the basis of a result of the comparison.

Advantageous Effects of the Invention

According to the present invention, it is possible to enhance the accuracy in estimating the position of the mobile object which moves autonomously along the route

DESCRIPTION OF EMBODIMENTS

Figure 1:
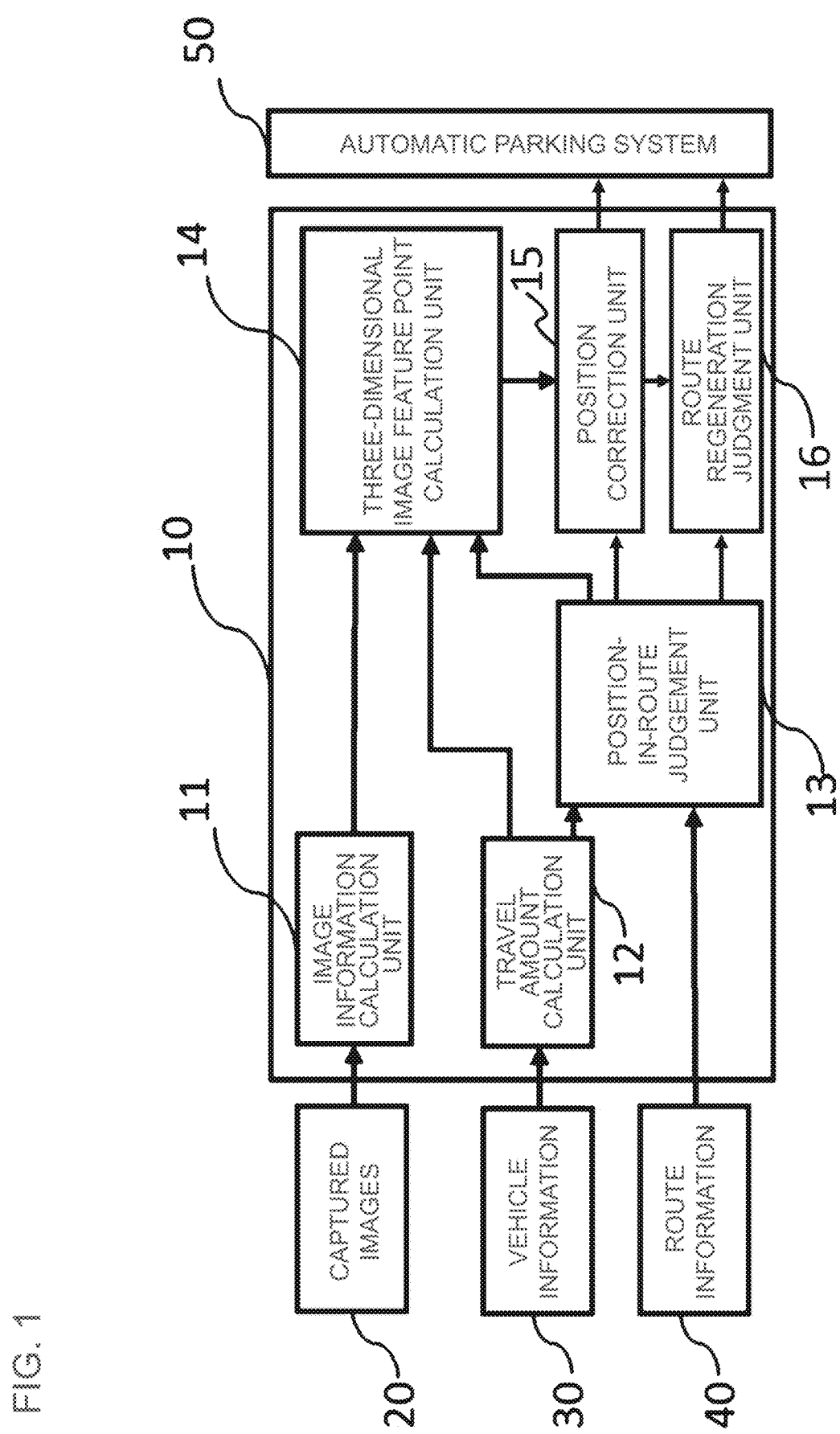
FIG. 1 is a diagram illustrating the configuration of a position estimation apparatus according to one embodiment of the present invention.

FIG. 1 is a diagram illustrating the configuration of a position estimation apparatus 10 according to one embodiment of the present invention. The position estimation apparatus 10 illustrated in FIG. 1 is mounted in a mobile object such as a passenger car and is used in combination with an automatic parking system 50. The mobile object in which the position estimation apparatus 10 is mounted will be hereinafter referred to as a "drivers own vehicle." The position estimation apparatus 10 operates periodically in a predetermined cycle, for example, every 100 ms.

Referring to FIG. 1, the position estimation apparatus 10 includes, as its functions, an image information calculation unit 11, a travel amount calculation unit 12, a position-in-route judgement unit 13, a three-dimensional image feature point calculation unit 14, a position correction unit 15, and a route regeneration judgment unit 16. The position estimation apparatus 10 has, for example, a CPU, a RAM, and a ROM and these functions can be implemented by decompressing a specified program, which is stored in the ROM, in the RAM and having the CPU execute the decompressed program. Incidentally, some or all of the functions of the position estimation apparatus 10 may be implemented by using hardware such as an FPGA.

Captured images 20, vehicle information 30, and route information 40 are input to the position estimation apparatus 10. The captured images 20 are images which are sequentially captured by an image capturing unit, which is not illustrated in the drawing, but mounted in the driver's own vehicle, at every specified frame rate. This image capturing unit should preferably be configured of a fish-eye camera or the like capable of capturing images with a wider angle of view than a camera with a normal angle of view. The vehicle information 30 is information about movements of the driver's own vehicle, which can be obtained from the driver's own vehicle and indicates, for example, a vehicle speed, a steering wheel angle, a brake condition, and a shift brake condition. The route information 40 is information about a parking route which is preset by the automatic parking system 50 and includes information indicating the position and shape of the parking route for the driver's own vehicle to drive when parking and information indicating the position of a relay spot(s) which is set on the parking route.

The image information calculation unit 11: extracts each of image feature points from a plurality of captured images 20 which are sequentially captured by the image capturing unit and input to the position estimation apparatus 10, and associates the image feature points with each other between the plurality of captured images 20. Then, the image information calculation unit 11 outputs the extracted image feature points and the result of association between the image feature points to the three-dimensional image feature point calculation unit 14.

The travel amount calculation unit 12: calculates a travel amount of the driver's own vehicle by means of dead reckoning on the basis of the vehicle information 30 which is input to the position estimation apparatus 10; and estimates the position of the driver's own vehicle from the obtained calculation result of the travel amount. Then, the travel amount calculation unit 12 outputs the estimation result of the position of the driver's own vehicle to the position-in-route judgement unit 13 and the three-dimensional image feature point calculation unit 14.

The position-in-route judgement unit 13 judges whether the driver's own vehicle has reached a specified position on the parking route or not, on the basis of the route information 40, which is input to the position estimation apparatus 10, and the estimation result of the position of the driver's own vehicle which is input from the travel amount calculation unit 12. In this embodiment, the position-in-route judgement unit 13 sets the relay spot(s) on the parking route indicated by the route information and the parking position, which is an end point of the parking route, as targets to be judged and judges whether the driver's own vehicle has reached these positions or not. Then, the position-in-route judgement unit 13 outputs the judgment result to the three-dimensional image feature point calculation unit 14, the position correction unit 15, and the route regeneration judgment unit 16.

The three-dimensional image feature point calculation unit 14 estimates the three-dimensional position(s) of the image feature point(s) in the real space on the basis of the result of associating the image feature points with each other between the plurality of captured images 20, which are input from the image information calculation unit 11, and the estimation result of the position of the driver's own vehicle which is input from the travel amount calculation unit 12. Then, the three-dimensional image feature point calculation unit 14 sets the three-dimensional image feature point indicating the estimated three-dimensional position and outputs it together with information of the corresponding image feature point to the position correction unit 15.

The position correction unit 15 corrects the position of the driver's own vehicle estimated by the travel amount calculation unit 12 on the basis of the judgment result input from the position-in-route judgement unit 13 and the information of the three-dimensional image feature point which is input from the three-dimensional image feature point calculation unit 14, that is, the estimation result of the three-dimensional position with respect to the image feature point. Specifically speaking, if the position-in-route judgement unit 13 determines that the driver's own vehicle has reached the relay spot, the position correction unit 15 calculates a position error between the position of the three-dimensional position indicated by the three-dimensional image feature point estimated by the three-dimensional image feature point calculation unit 14, when the three-dimensional position is reprojected onto the then captured image 20, in the captured image 20 and the image feature point extracted from the captured image 20. Then, the position correction unit 15 repeatedly corrects the three-dimensional image feature point and the position of the driver's own vehicle so as to reduce the calculated position error and outputs the corrected position of the driver's own vehicle, which is finally obtained, to the route regeneration judgment unit 16 and the automatic parking system 50. However, if the position of the driver's own vehicle has not been corrected yet, the position correction unit 15 outputs the pre-correction position of the driver's own vehicle, that is, the estimation result of the position of the driver's own vehicle, which is input from the travel amount calculation unit 12, without any change. Incidentally, the content of the processing executed by the position correction unit 15 will be explained later in detail.

The route regeneration judgment unit 16: compares the corrected position of the driver's own vehicle, which is input from the position correction unit 15, with the parking route indicated by the route information 40 on the basis of the judgment result input from the position-in-route judgement unit 13, and judges whether or not to regenerate the parking route on the basis of the comparison result. Then, if the route regeneration judgment unit 16 determines to regenerate the parking route, it issues an instruction to the automatic parking system 50 to regenerate the parking route.

The automatic parking system 50, recognizes candidate parking positions on the basis of the captured images 20 which are input from the image capturing unit; and sets any one of the candidate parking positions as the parking position. Then, the automatic parking system 50 generates a parking route from the current position of the driver's own vehicle to the set parking position and controls the driver's own vehicle to cause the driver's own vehicle to move autonomously to the parking position along the parking route. Under this circumstance, the automatic parking system 50 controls the driver's own vehicle by using the corrected position of the driver's own vehicle which is output from the position estimation apparatus 10. Furthermore, if the instruction is issued from the position estimation apparatus 10 to regenerate the parking route, the automatic parking system 50 regenerates the parking route in accordance with the instruction and subsequently controls the driver's own vehicle to make it move autonomously along the regenerated parking route.

Figure 2:
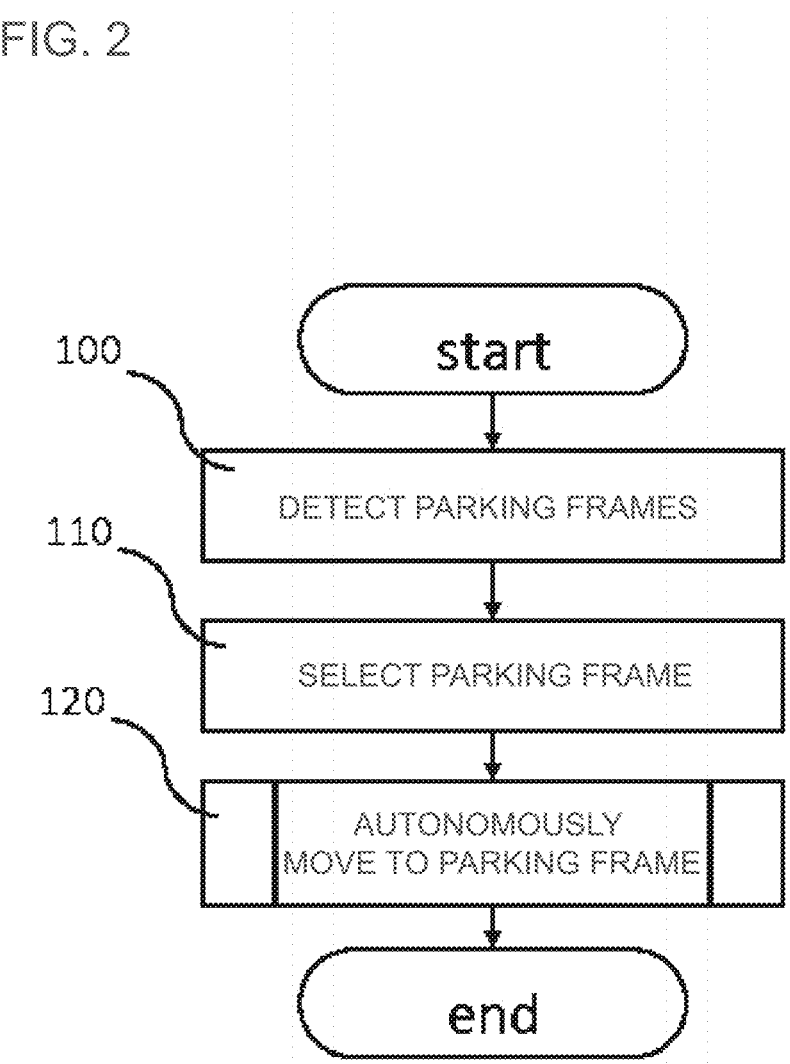
FIG. 2 is a flowchart illustrating the entire processing by the position estimation apparatus and an automatic parking system according to one embodiment of the present invention.
Figure 3:
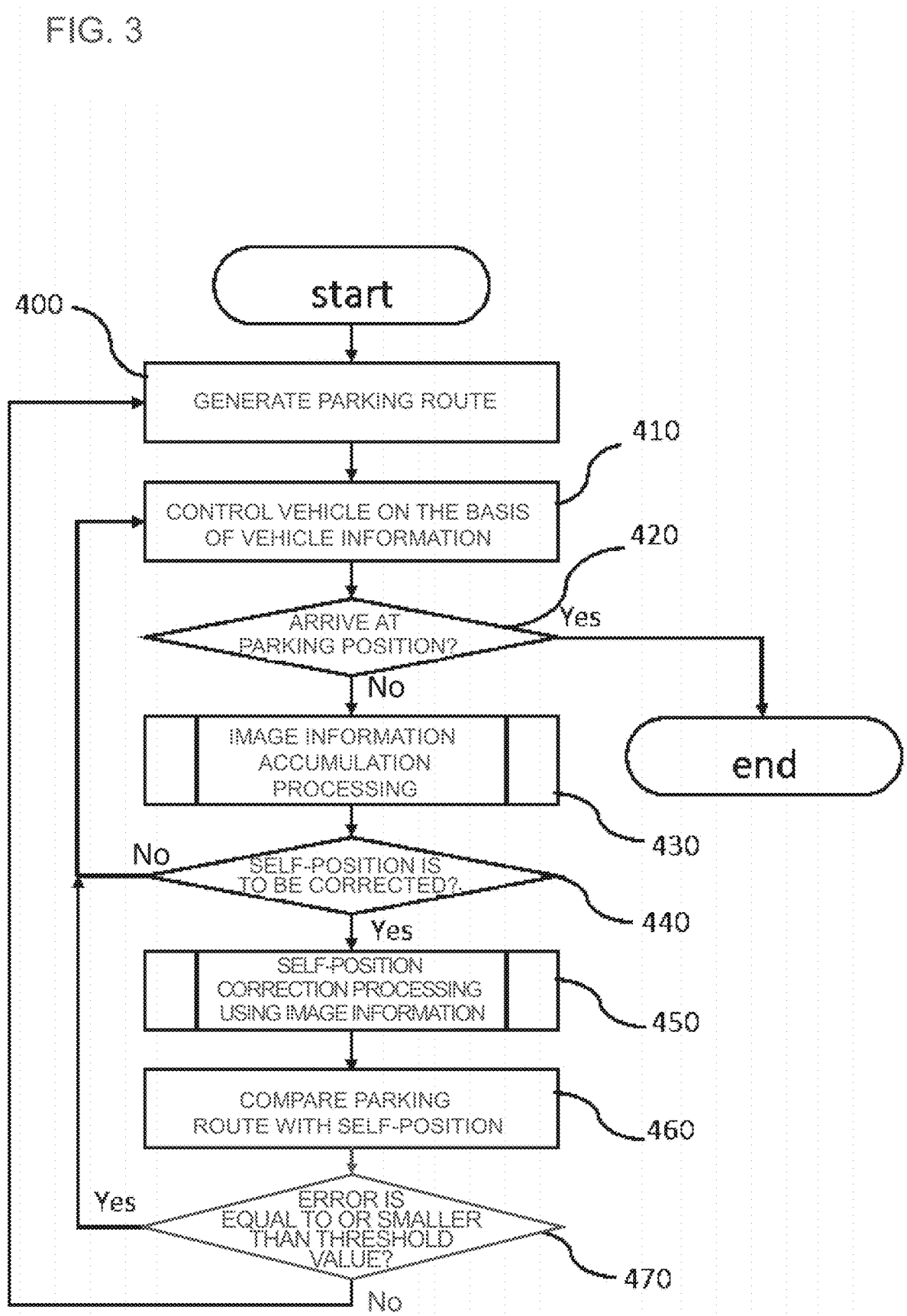
FIG. 3 is a flowchart illustrating autonomous movement processing.
Figure 4:
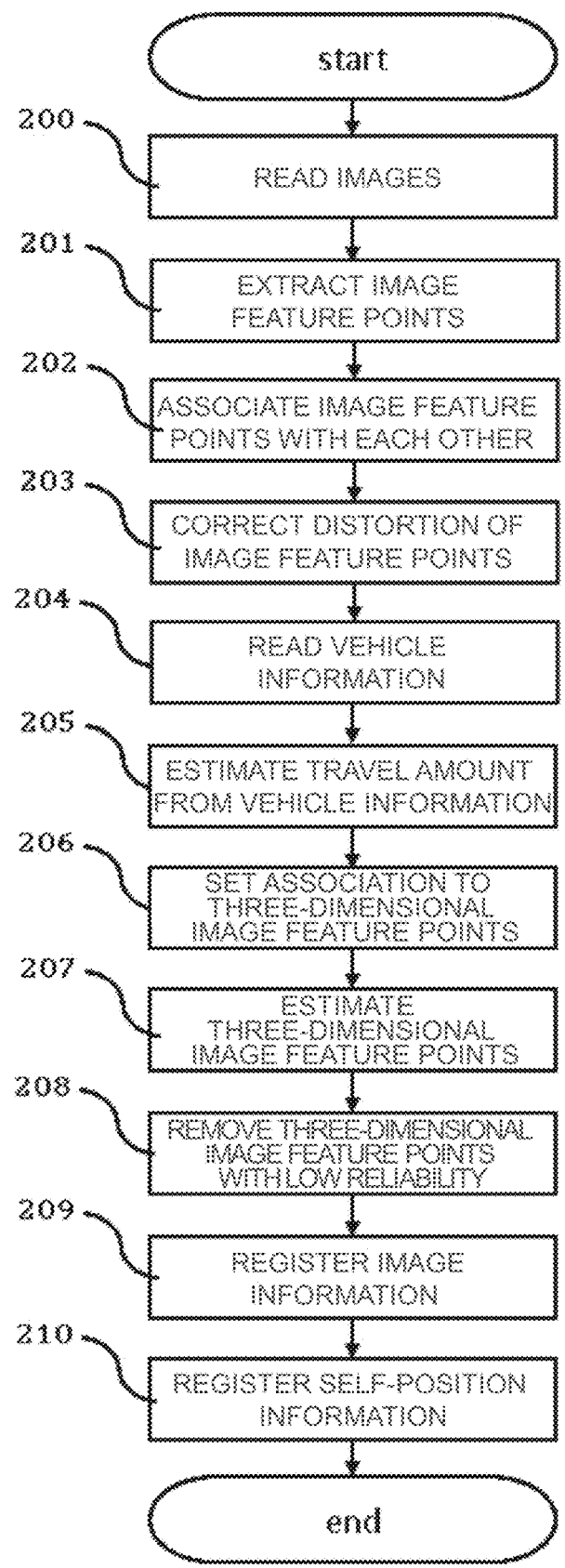
FIG. 4 is a flowchart illustrating image information accumulation processing.
Figure 5:
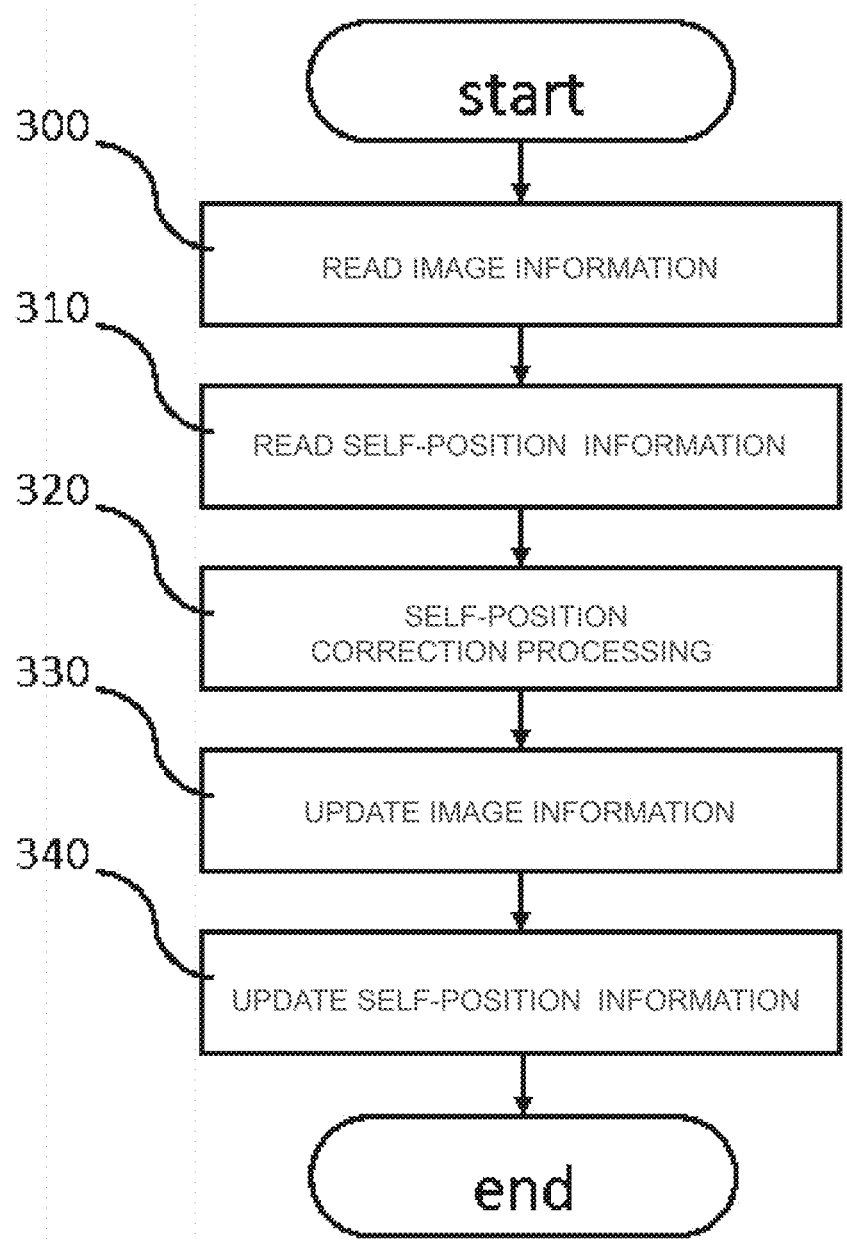
FIG. 5 is a flowchart illustrating self-position correction processing.

Next, the processing executed by the position estimation apparatus 10 and the automatic parking system 50, respectively, will be explained with reference to flowcharts in FIGS. 2 to 5. FIG. 2 is a flowchart illustrating the entire processing by the position estimation apparatus 10 and the automatic parking system 50 according to one embodiment of the present invention FIG. 3 is a flowchart of autonomous movement processing in the processing in FIG. 2. FIG. 4 is a flowchart of image information accumulation processing executed by the position estimation apparatus 10 in the autonomous movement processing in FIG. 3. FIG. 5 is a flowchart of self-position correction processing executed by the position estimation apparatus 10 in the autonomous movement processing in FIG. 3. Incidentally, the respective flowcharts in FIGS. 2 to 5 will be explained below by assuming parking scenes of the driver's own vehicle as illustrated in FIGS. 6 to 14 as examples.

Figure 15:
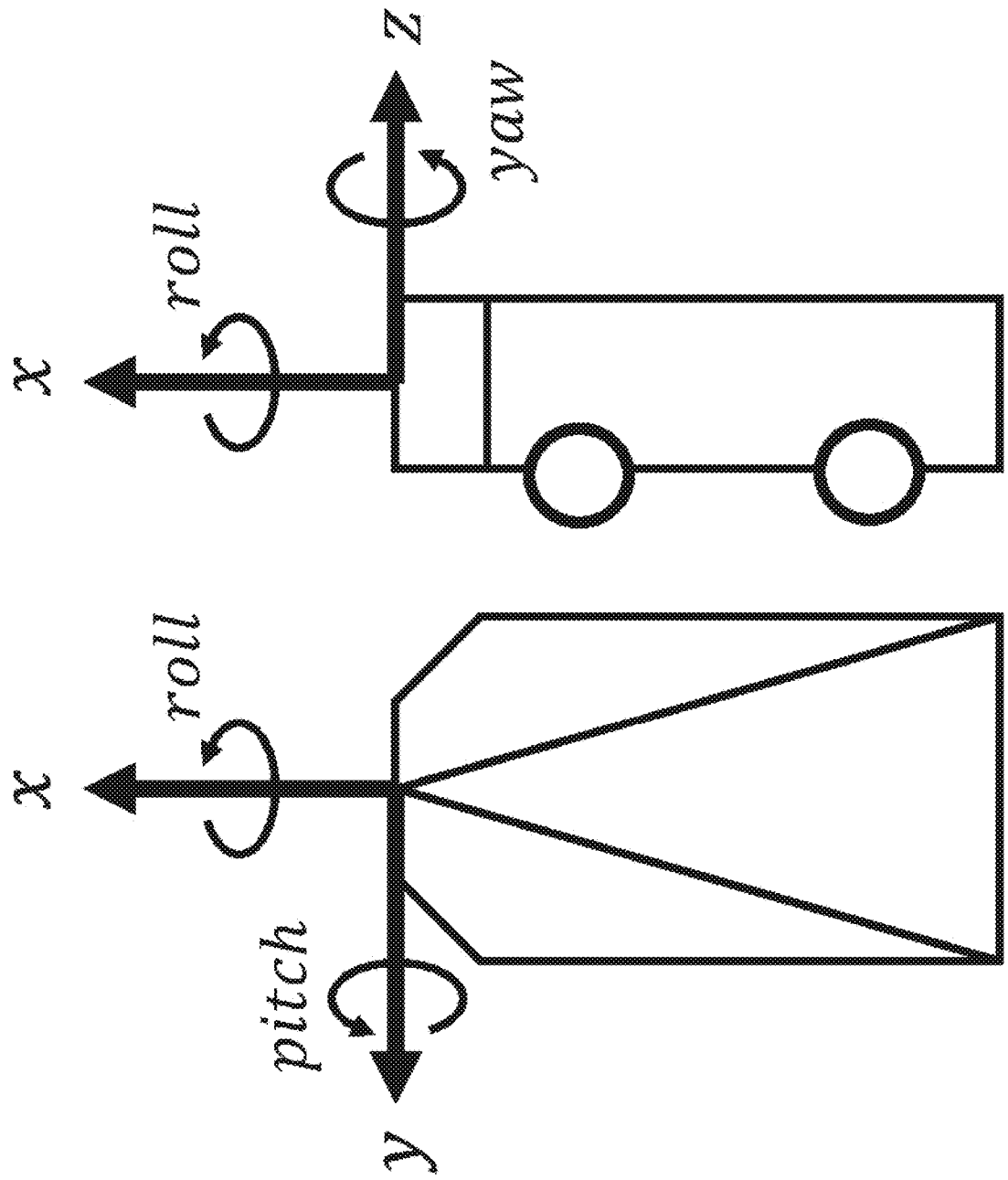
FIG. 15 is a diagram illustrating a vehicle coordinate system.

Now, prior to the explanation about FIGS. 2 to 5, a coordinate system used for the processing by the position estimation apparatus 10 will be explained below. FIG. 15 is a diagram illustrating a vehicle coordinate system used by the position estimation apparatus 10 to indicate the position and posture of the driver's own vehicle; and FIG. 16 is a camera coordinate system used by the position estimation apparatus 10 to indicate the position and posture of the image capturing unit.

With the vehicle coordinate system illustrated in FIG. 15, a front-back direction relative to a facing direction of the driver's own vehicle is defined as an x-axis, a right-left direction is defined as a y-axis, and an up-down direction is defined as a z-axis, respectively. Under this circumstance, the x-axis is set so that a traveling direction (a front face direction) of the driver's own vehicle is set as positive; the y-axis is set so that the left direction relative to the traveling direction of the driver's own vehicle is set as positive; and the z-axis is set so that a direction directly above the driver's own vehicle is set as positive. Also, regarding rotations around the respective axes (roll, pitch, and yaw), their clockwise directions are set respectively as positive. In this embodiment, a rotation amount and a translational motion amount of the driver's own vehicle are expressed as Expression (1) below by using the vehicle coordinate system in FIG. 15 and these amounts are used to represent the position and posture of the driver's own vehicle. In Expression (1), $\eta_{roll}$ represents the rotation amount around the x-axis; $\theta_{pitch}$ a represents the rotation amount around the y-axis; $\theta_{yaw}$ represents the rotation amount around the z-axis; $x_{car}$ represents the translational motion amount in the x-axis direction; $y_{car}$ represents the translational motion amount in the y-axis direction, and $z_{car}$ represents the translational motion amount in the z-axis direction, respectively. Incidentally, the rotation amount corresponds to the posture of the driver's own vehicle and the translational motion amount corresponds to the position of the driver's own vehicle.

Rotation Amount of Driver's Own Vehicle=$(\theta_{roll}, \theta_{patch}, \theta_{yaw})$ Translational Motion Amount of Driver's Own Vehicle=$(x_{car}, y_{car}, z_{car})$ (1)

Figure 16:
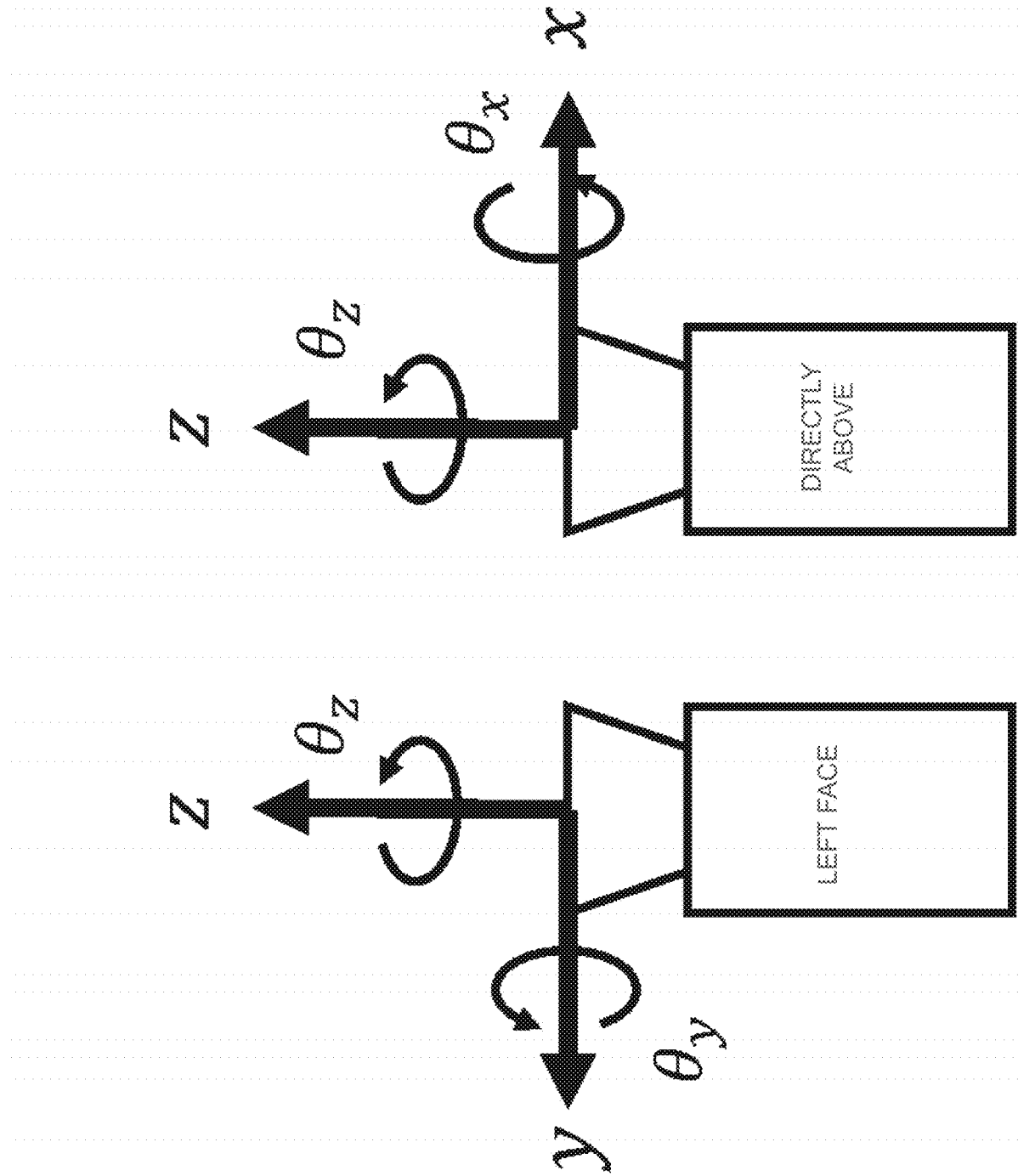
FIG. 16 is a diagram illustrating a camera coordinate system.

In the camera coordinate system illustrated in FIG. 16, a right-left direction is defined as an x-axis and an up-down direction is defined as a y-axis, respectively, when the image capturing unit is viewed from the direction directly above; and an optical axis direction of the image capturing unit is defined as a z-axis. Under this circumstance, the x-axis is set sot that the right direction of the image capturing unit is set as positive; the y-axis is set so that the direction directly below the image capturing unit is set as positive; and the z-axis is set so that an image capturing direction of the image capturing unit is set as positive. Moreover, regarding rotations around the respective axes, their clockwise directions are set respectively as positive. In this embodiment, a rotation amount and a translational motion amount of the image capturing unit are expressed as Expression (2) below by using the camera coordinate system in FIG. 16 and the position and the posture of the image capturing unit are expressed by using them. In Expression (2), $\theta_x$ represents the rotation amount around the x-axis, $\theta_y$ represents the rotation amount around the y-axis; $\theta_z$ represents the rotation amount around the z-axis; $x_{camera}$ represents the translational motion amount in the x-axis direction; $y_{camera}$ represents the translational motion amount in the y-axis direction; and $z_{camera}$ represents the translational motion amount in the z-axis direction, respectively. Incidentally, the rotation amount corresponds to the posture of the image capturing unit and the translational motion amount corresponds to the position of the image capturing unit.

$$\text{Rotation Amount of image Capturing Unit} = (\theta_x, \theta_y, \theta_z)$$

$$\text{Translational Motion Amount of Image Capturing Unit} = (x_{camera}, y_{camera}, z_{camera}) \quad (2)$$

In the following explanation, the rotation amount and the translational motion amount of the driver's own vehicle in the vehicle coordinate system, which are expressed by Expression (1) mentioned above, and the rotation amount and the translational motion amount of the image capturing unit in the camera coordinate system, which are expressed by Expression (2) mentioned above, are calculated by the travel amount calculation unit 12 in the position estimation apparatus 10 on the basis of the vehicle information 30 in every specified processing cycle.

Subsequently, the flowchart in FIG. 2 will be explained. The entire processing illustrated in the flowchart in FIG. 2 is started by activation of the automatic parking system 50 by a user.

In step 100, the automatic parking system 50 detects parking frames. Under this circumstance, for example, as illustrated in an example of a parking scene in FIG. 6, when the driver's own vehicle is moving in a direction indicated with an arrow 501 from a parking start position 500, the automatic parking system 50 detects areas in which other vehicles have not parked yet, as candidate parking positions 503, 504, from among the respective areas surrounded with white lines 502.

Figure 6:
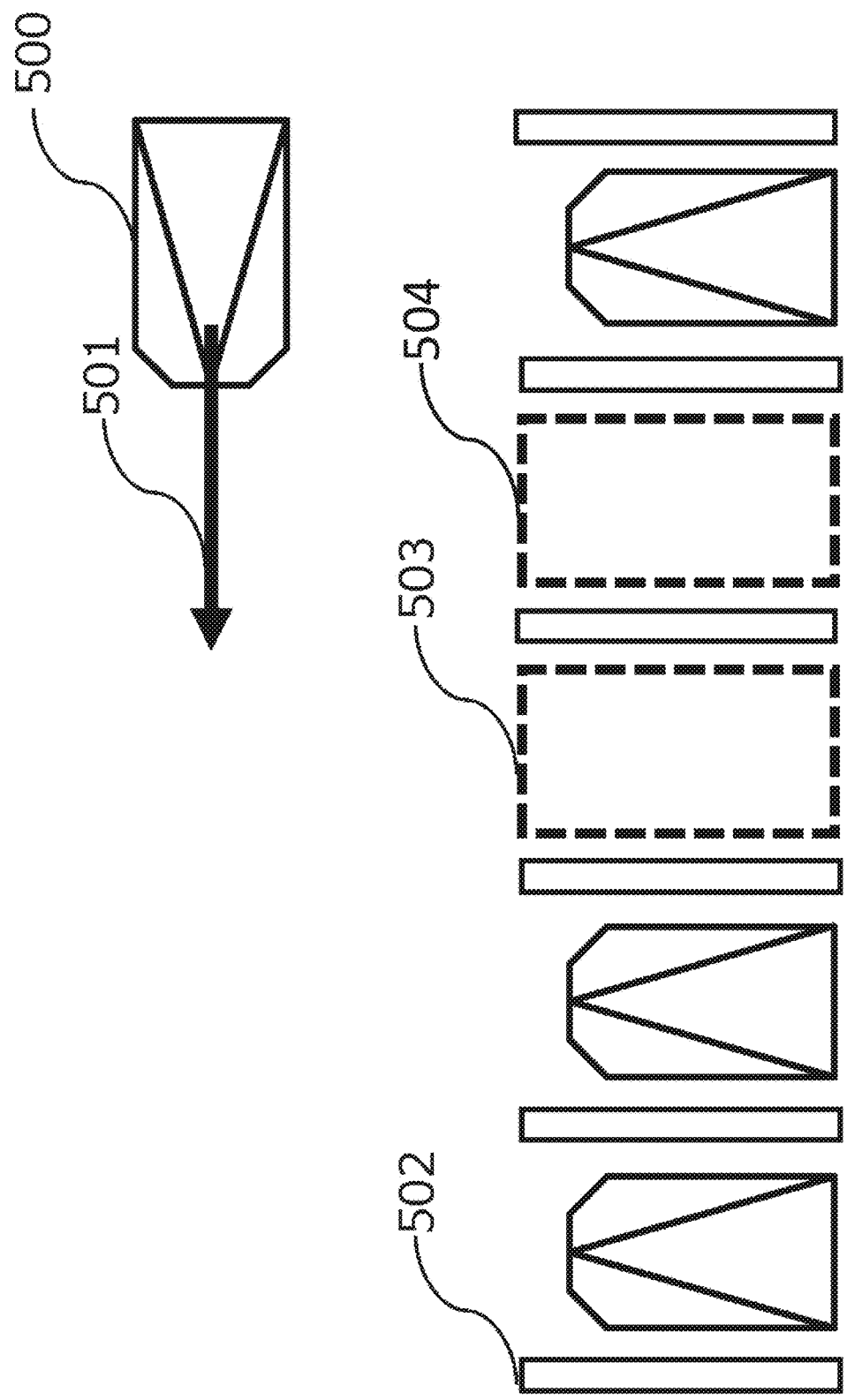
FIG. 6 is a diagram illustrating a parking scene for detecting parking frames.
Figure 7:
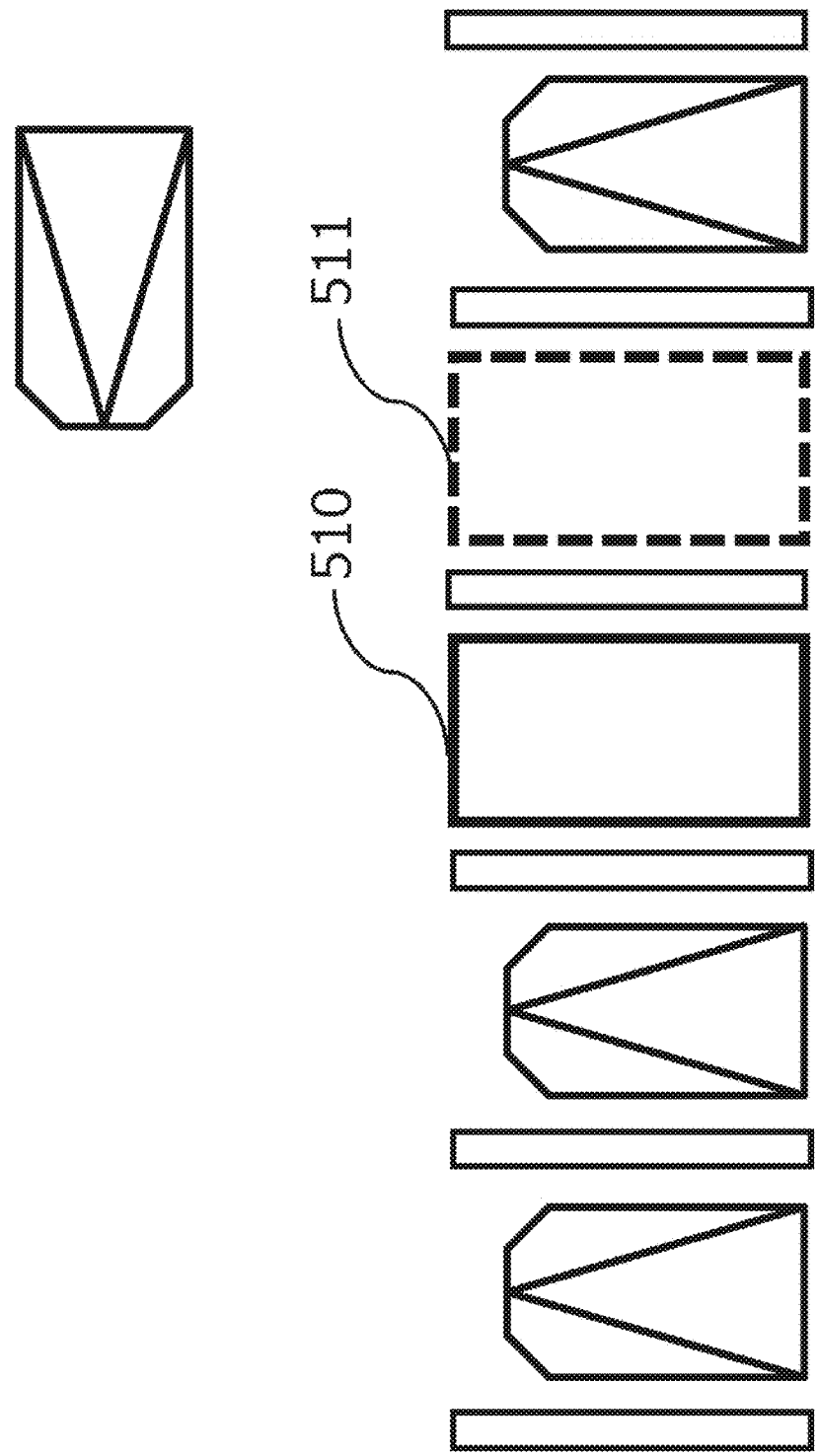
FIG. 7 is a diagram illustrating a parking scene for selecting a parking frame.
Figure 8:
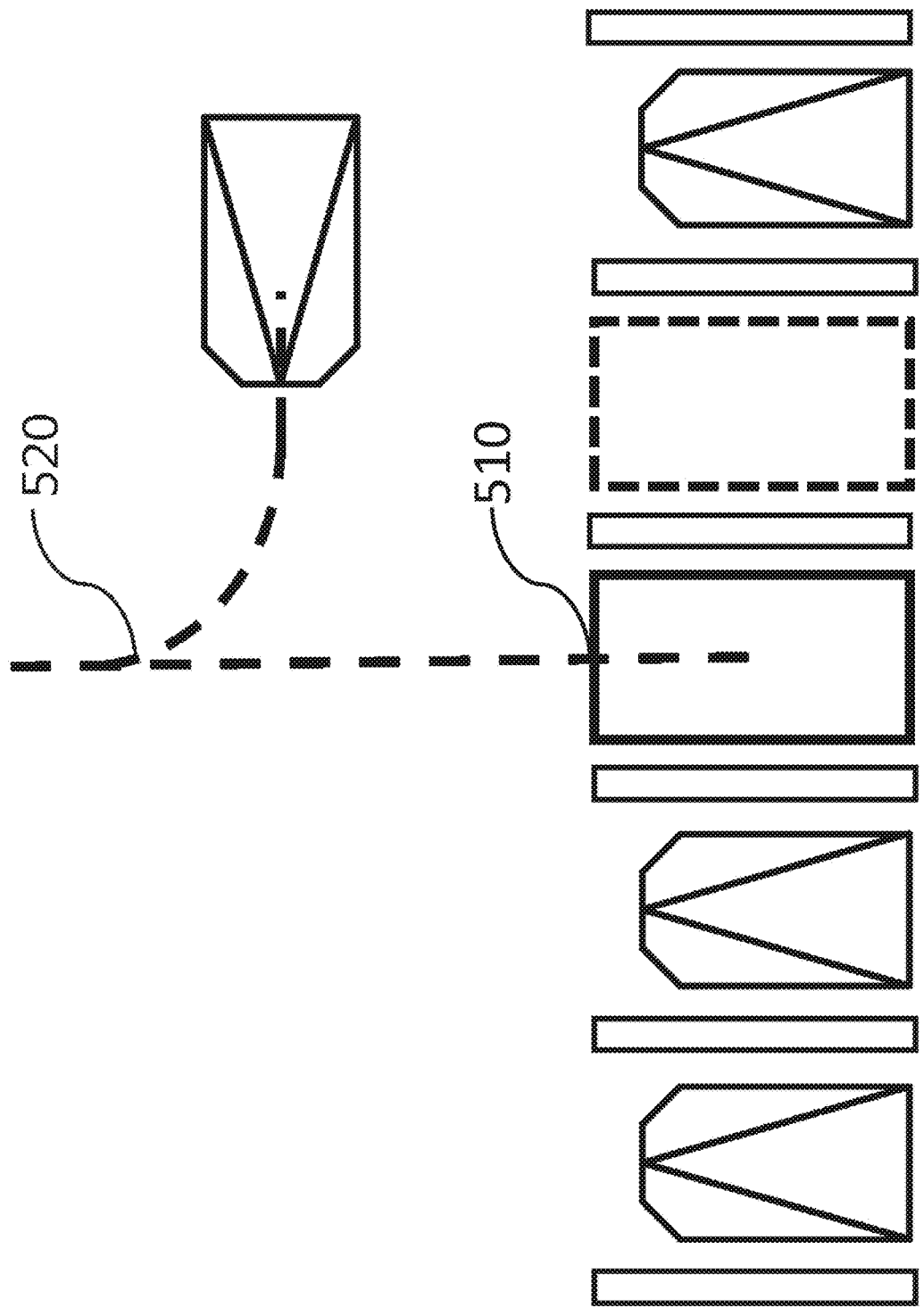
FIG. 8 is a diagram illustrating a parking scene for explaining generation of a parking route.
Figure 9:
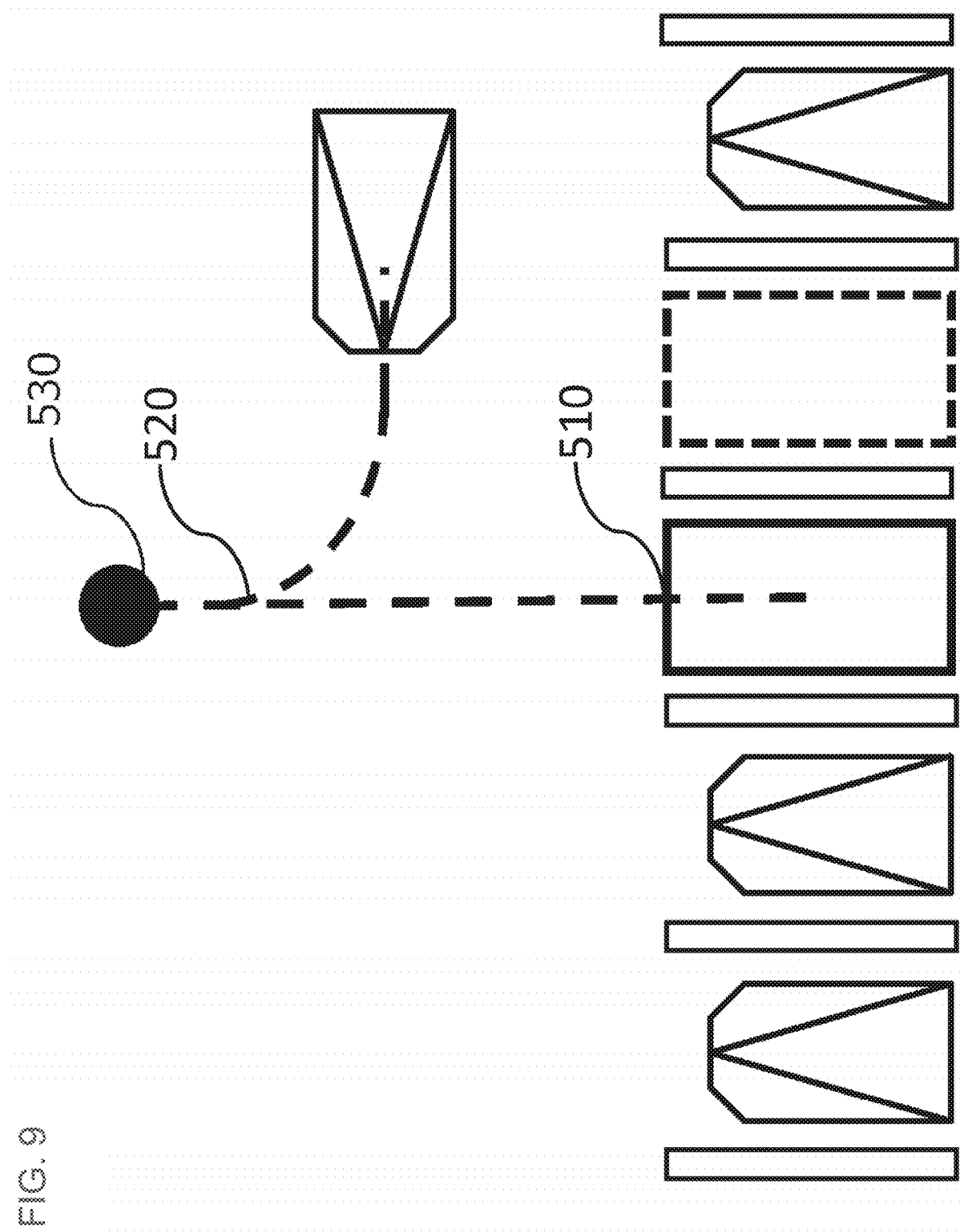
FIG. 9 is a diagram illustrating a parking scene for setting a relay spot.
Figure 10:
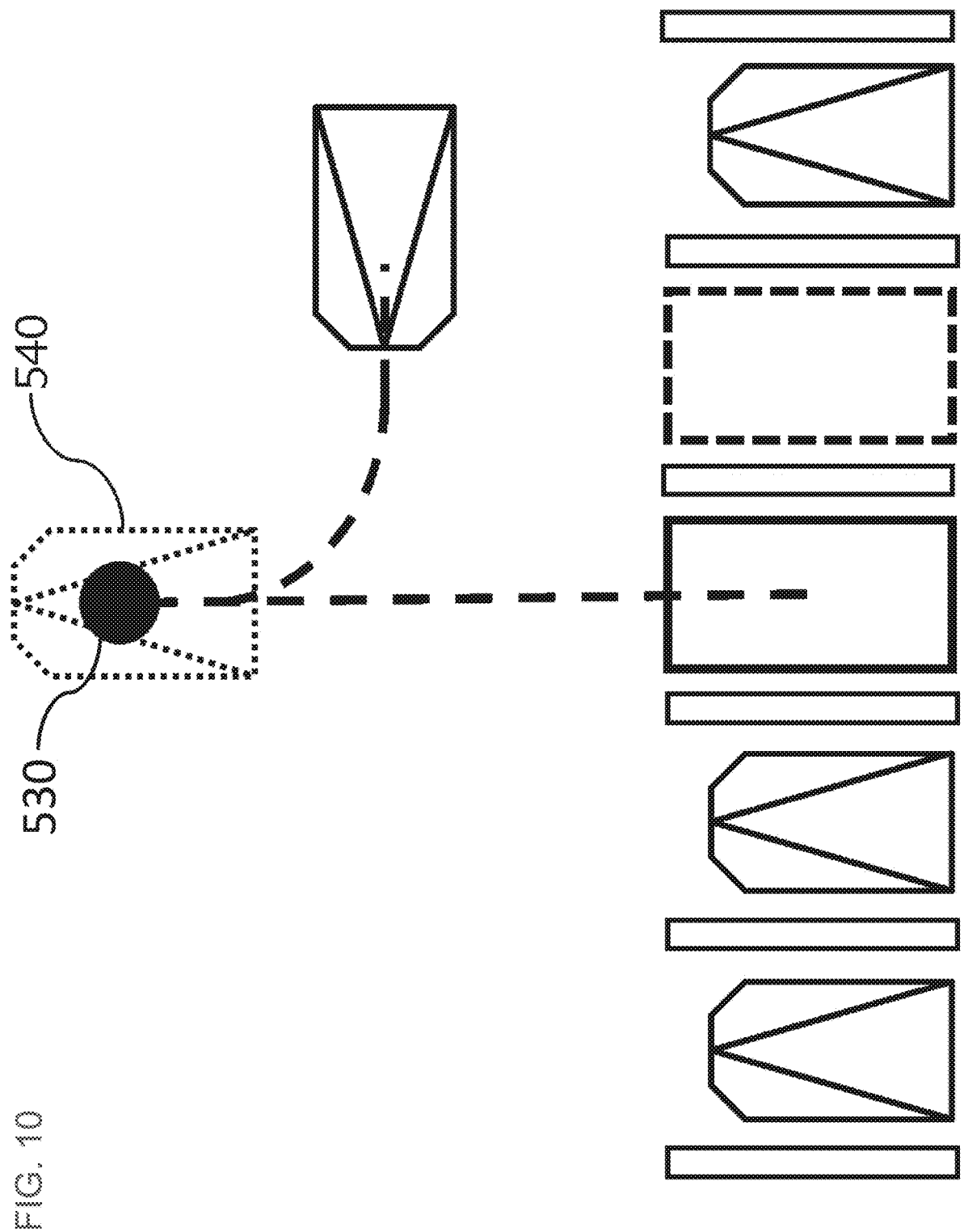
FIG. 10 is a diagram illustrating a parking scene for setting an assumed position of the driver's own vehicle at the relay spot.

In step 110, the automatic parking system 50 selects a parking frame. Under this circumstance, for example, as illustrated in an example of a parking scene in FIG. 7, the automatic parking system 50 selects any one of the candidate parking positions detected in step 100 and sets it as a parking position 510. Incidentally, the candidate parking position which is not selected is set as an unselected position 511 and is excluded from subsequent processing targets. Alternatively, when it becomes impossible to park at the parking position 510, the unselected position 511 may be newly set as a parking position. The example of the parking scene illustrated in FIG. 7 shows that the candidate parking position 503 in FIG. 6 is set as the parking position 510 and the candidate parking position 504 is set as the unselected position 511.

Regarding the parking frame selection in step 110, for example, each candidate parking position detected in step 100 may be presented to the user by, for example, displaying it and the user may be made to select any one of them. Alternatively, the automatic parking system 50 may automatically select the candidate parking position. For example, a larger area or an area which can be reached with a smaller number of the steering-wheel turns to park the vehicle may be automatically selected as the candidate parking position from among the plurality of candidate parking positions. However, a method for selecting the candidate parking position is not limited to this method and other selecting methods may be used.

After deciding the parking position by the parking frame selection in step 110, autonomous movement processing for causing the drivers own vehicle to move autonomously to the decided parking position is executed in step 120. Regarding this autonomous movement processing, the position estimation apparatus 10 and the automatic parking system 50 are made to operate in cooperation with each other in accordance with a flowchart illustrated in FIG. 3. When the driver's own vehicle has arrived at the parking position by the autonomous movement processing in step 120, the flowchart illustrated in FIG. 2 is terminated.

Next, the autonomous movement processing executed in step 120 in FIG. 2 will be explained with reference to FIG. 3.

In step 400, the automatic parking system 50 generates a parking route to the parking position. Under this circumstance, the automatic parking system 50 generates the parking route on the basis of the relationship between the position of the driver's own vehicle and the parking position and positions of obstacles or the like existing around the driver's own vehicle and sets one or a plurality of relay spots on that parking route. Then, the automatic parking system 50 calculates the position and posture of the driver's own vehicle at the time of arrival at a relay spot and sets an assumed position of the driver's own vehicle at the relay spot on the basis of such calculation results. As a result, for example, a parking route 520 is set from the current position of the driver's own vehicle to the parking position 510 as illustrated in an example of a parking scene in FIG. 8. Moreover, for example, as illustrated in an example of a parking scene in FIG. 9, a relay spot 530 is set at a steering-wheel-turning spot on the parking route 520 where the steering wheel of the driver's own vehicle is turned to switch from the forward movement to the reverse movement or from the reverse movement to the forward movement; and an assumed position 540 of the driver's own vehicle is set at this relay spot 530 as illustrated in an example of a parking scene in FIG. 10. Incidentally, an arbitrary method can be used to generate the parking route; however, a specific explanation about it is omitted. Moreover, the relay spots may be set with arbitrary distances between them or at arbitrary positions, for example, every several meters or at every steering-wheel-turning point.

Next, in step 410, the automatic parking system 50, acquires the position of the driver's own vehicle which is output from the position correction unit 15 for the position estimation apparatus 10; and controls the driver's own vehicle to make it move autonomously along the parking route generated in step 400 on the basis of this position information.

Then, in step 420, the position estimation apparatus 10 causes the position-in-route judgement unit 13 to judge whether the driver's own vehicle has arrived at the parking position or not under this circumstance, for example, the position-in-route judgement unit 13: calculates differences between the position and posture of the driver's own vehicle, which are assumed at the time of arrival at the parking position, and the current position and posture of the driver's own vehicle, respectively; and judges whether the driver's own vehicle has arrived at the parking position or not, by judging whether each calculated difference is equal to or smaller than a preset threshold value or not. As a result, if it is determined that the driver's own vehicle has not arrived at the parking position yet, the processing proceeds to step 430; and if it is determined that the driver's own vehicle has arrived at the parking position, the autonomous movement processing illustrated in the flowchart in FIG. 3 is terminated. Incidentally, the position and posture of the driver's own vehicle, which are assumed at the arrival at the parking position, can be calculated by a method similar to that for calculating the assumed position of the driver's own vehicle at the relay spot in step 400.

In step 420, the position-in-route judgement unit 13 calculates the differences between the position and posture of the driver's own vehicle, which are assumed at the time of arrival at the parking position, and the current position and posture of the driver's own vehicle by using, for example, Calculation Expressions (3) to (7) below.

[Math. 1]

$$P = \begin{pmatrix} r_{11} & r_{12} & r_{13} & t_1 \\ r_{21} & r_{22} & r_{23} & t_2 \\ r_{31} & r_{32} & r_{33} & t_3 \\ 0 & 0 & 0 & 1 \end{pmatrix} \quad (3)$$

$$P_{error} = P_{car}^{-1} P_{current} \quad (4)$$

$$\text{diff} = 5\lambda(r_{11\_error} + r_{22\_error} + r_{33\_error} - 1.0) \quad (5)$$

$$E_{rotation} = a\cos(\max(\min(\text{diff},1.0),-1.0)) \quad (6)$$

$$E_{translation} = \sqrt{(t_{1\_error}^2 + t_{2\_error}^2 + t_{3\_error}^2)} \quad (7)$$

Expression (3) is an affine matrix indicating the position and posture of the driver's own vehicle at each spot, and $P_{error}$, $P_{car}^{-1}$, and $P_{current}$ in Expression (4) are expressed by using this affine matrix Incidentally, $P_{car}^{-1}$ is an inverse matrix of the affine matrix indicating the position and posture of the driver's own vehicle at the parking position; and $P_{current}$ is an affine matrix indicating the position and posture of the driver's own vehicle at the current position.

Each matrix element in the affine matrix of Expression (3) is expressed by Expressions (8) and (9) below.

[Math. 2]

$$\begin{pmatrix} r_{11} & r_{12} & r_{13} \\ r_{21} & r_{22} & r_{23} \\ r_{31} & r_{32} & r_{33} \end{pmatrix} = R_{roll} \times R_{pitch} \times R_{yaw} \quad (8)$$

$$\begin{pmatrix} t_1 \\ t_2 \\ t_3 \end{pmatrix} = \begin{pmatrix} x_{car} \\ y_{car} \\ z_{car} \end{pmatrix} \quad (9)$$

In Expression (8) matrixes $R_{roll}$, $R_{pitch}$, and $R_{yaw}$ are expressed by Expressions (10) to (12) below, respectively, by using the respective elements $\theta_{roll}$, $\theta_{pitch}$, and $\theta_{yaw}$ of the rotation amount of the driver's own vehicle in Expression (1).

[Math. 3]

$$R_{roll} = \begin{pmatrix} 1 & 0 & 0 \\ 0 & \cos\theta_{roll} & -\sin\theta_{roll} \\ 0 & \sin\theta_{roll} & \cos\theta_{roll} \end{pmatrix} \quad (10)$$

$$R_{pitch} = \begin{pmatrix} \cos\theta_{pitch} & 0 & \sin\theta_{pitch} \\ 0 & 1 & 0 \\ -\sin\theta_{pitch} & 0 & \cos\theta_{pitch} \end{pmatrix} \quad (11)$$

$$R_{yaw} = \begin{pmatrix} \cos\theta_{yaw} & -\sin\theta_{yaw} & 0 \\ \sin\theta_{yaw} & \cos\theta_{yaw} & 0 \\ 0 & 0 & 1 \end{pmatrix} \quad (12)$$

On the other hand, $x_{car}$, $y_{car}$, and $z_{ca}$ in Expression (9) are the respective elements of the translational motion amount of the driver's own vehicle in Expression (1).

Incidentally, the rotation amount and the translational motion amount of the driver's own vehicle are calculated by the travel amount calculation unit 12 as described earlier. However, if the position correction unit 15 has executed the self-position correction processing described later in step 450 and has thereby corrected the position of the driver's own vehicle, it is preferable that the judgment of step 420 be performed by using the rotation amount and the translational motion amount corresponding to the corrected position.

Elements $r_{11\_error}$, $r_{22\_error}$, and $r_{33\_error}$ in Expression (5) represent values of matrix elements corresponding respectively to the respective matrix elements $r_{11}$, $r_{22}$, and $r_{33}$ of Expression (3) in the affine matrix of the position posture error $P_{error}$ calculated according to Expression (4). Expression (6) indicates that: a smaller value of either an angular difference diff or 1 which is calculated according to Expression (5) is compared with −1; and a rotation error $E_{rotation}$ is calculated from an inverse cosine of a larger value of the above comparison. Moreover, $t_{1\_error}$, $t_{2\_error}$, and $t_{3\_error}$ in Expression (7) also represent values of matrix elements corresponding respectively to the respective matrix elements $t_1$, $t_2$, and $t_3$ of Expression (3) in the affine matrix of the position posture error $P_{error}$, calculated according to Expression (4). Expression (7) indicates that a position error $E_{translation}$, is calculated from these values.

In step 420, the difference between the assumed posture of the driver's own vehicle at the time of arrival at the parking position and the current posture of the driver's own vehicle and the difference between the assumed position of the driver's own vehicle at the time of arrival at the parking position and the current position of the driver's own vehicle can be calculated, respectively, by calculating the rotation error $E_{rotation}$ and the position error $E_{translation}$ which are described above. Then, whether the driver's own vehicle has arrived at the parking position or not can be judged by comparing these differences with their respective threshold values.

Figure 11:
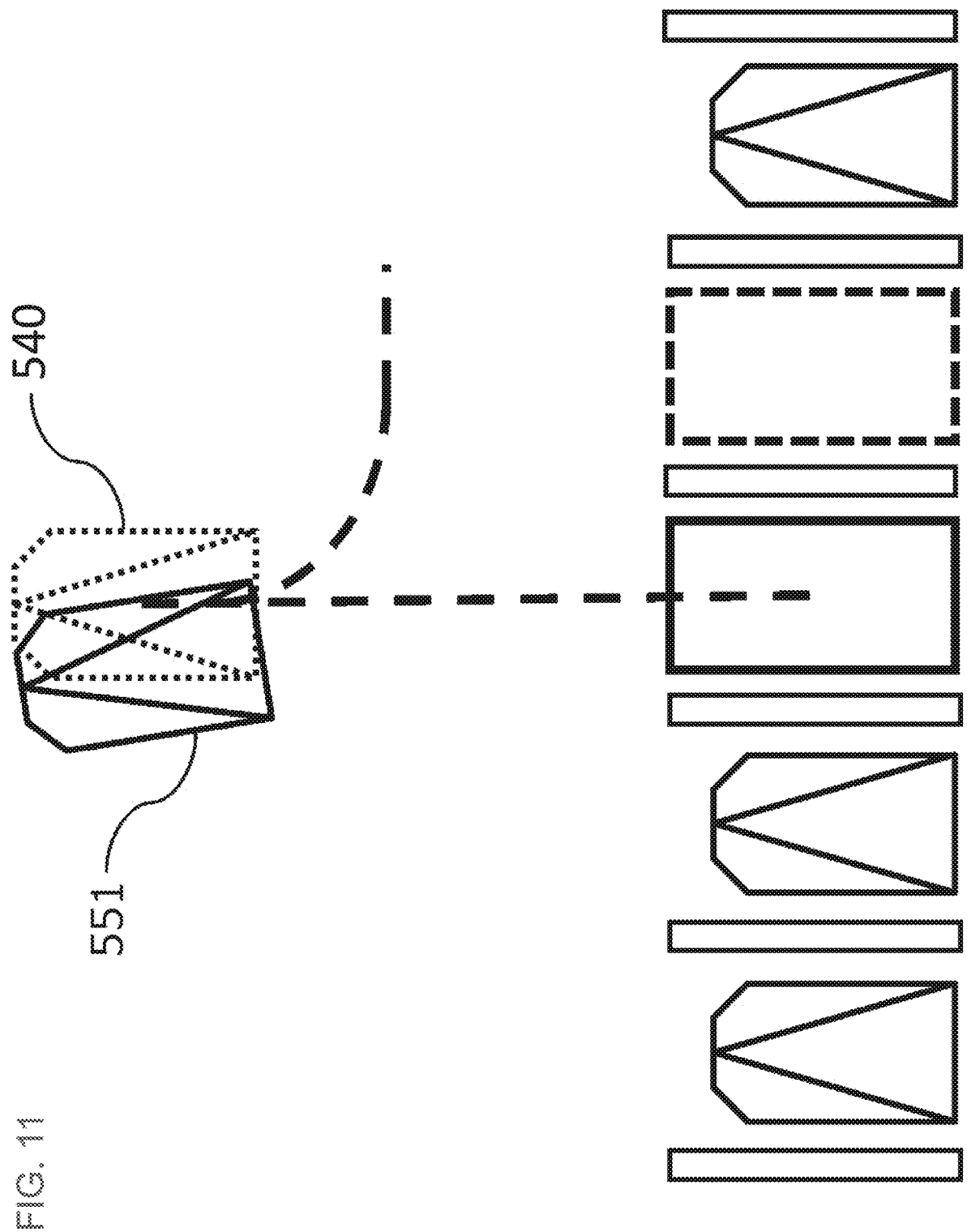
FIG. 11 is a diagram illustrating a parking scene where the driver's own vehicle has reached the relay spot.

FIG. 11 illustrates an example of a parking scene where the driver's own vehicle has reached a relay spot. In the parking scene in FIG. 11, a deviation has occurred between the assumed position 540, which is set in step 400, and the actual position of the driver's own vehicle 551 at the relay spot. This is because the travel amount of the driver's own vehicle, which is calculated from the vehicle information 30 under control in step 410, includes an error.

When the processing proceeds from step 420 to step 430, the position estimation apparatus 10 executes image information accumulation processing in step 430. Under this circumstance, the image information calculation unit 11, the travel amount calculation unit 12, and the three-dimensional image feature point calculation unit 14 execute the image information accumulation processing in accordance with the flowchart in FIG. 4. Consequently, for example, information of image feature points extracted respectively from the captured images 20, which are sequentially captured by the image capturing unit at every specified frame rate, information of associating the image feature points with each other between the captured images 20, and information of three-dimensional positions of the image feature points estimated in the real space are accumulated in the position estimation apparatus 10. Incidentally, the details of the image information accumulation processing in step 420 will be explained later.

In step 440, the position estimation apparatus 10 judges whether or not to correct the position of the driver's own vehicle. Under this circumstance, whether or not to correct the position of the driver's own vehicle is judged by causing the position-in-route judgement unit 13 to judge whether the driver's own vehicle has reached the next relay spot or not Specifically speaking, if the drivers own vehicle has not reached the next relay spot yet, the position estimation apparatus 10 determines to not correct the position of the driver's own vehicle, returns to step 410, and repeats the aforementioned processing. On the other hand, if the driver's own vehicle has reached the next relay spot, the position estimation apparatus 10 determines to correct the position of the driver's own vehicle and proceeds to step 450. Incidentally, the judgment on whether the driver's own vehicle has reached the next relay spot or not in step 440 can be performed by a method similar to that for the judgment on the arrival at the parking position in step 420 on the basis of the position and the posture indicating the assumed position of the driver's own vehicle, which is calculated in step 400.

In step 450, the position estimation apparatus 10 executes the self-position correction processing Under this circumstance, the position correction unit 15 is made to execute the self-position correction processing in accordance with the flowchart illustrated in FIG. 5. Consequently, the position of the driver's own vehicle is corrected by using the information accumulated by the image information accumulation processing in step 430. Incidentally, the details of the self-position correction processing in step 450 will be explained later.

In step 460, the position estimation apparatus 10 causes the route regeneration judgment unit 16 to compare the position of the driver's own vehicle corrected by the self-position correction processing in step 450 with the parking route Under this circumstance, the comparison between the corrected position of the driver's own vehicle and the parking route is performed by calculating the differences respectively between the corrected position and posture of the driver's own vehicle and the position and posture of the driver's own vehicle which are preset for the relay spot that is set on the parking route Incidentally, a method similar to that for the judgment on the arrival at the relay spot in step 440 can be used for this calculation. Specifically speaking, the differences between the corrected position and posture of the driver's own vehicle and the position and posture of the driver's own vehicle, which are assumed at the relay spot, can be calculated respectively on the basis of the position and posture indicating the assumed position of the driver's own vehicle at the relay spot as calculated in step 400 by a method similar to that for the judgment on the arrival at the parking position in step 420.

In step 470, the position estimation apparatus 10 causes the route regeneration judgment unit 16 to judge whether the respective differences in the position and the posture, which are calculated in step 460, that is, an error at the relay spot with respect to the corrected position and posture of the driver's own vehicle are equal to or smaller than specified threshold values or not. As a result, if both these calculation results are equal to or smaller than the threshold values, the position estimation apparatus 10: determines that the corrected position of the driver's own vehicle is appropriate and, therefore, the parking route should not be regenerated; and returns to step 410. In this case, with the automatic parking system 50, the control is conducted by using the corrected position of the driver's own vehicle, thereby causing the driver's own vehicle to continue moving autonomously.

Figure 12:
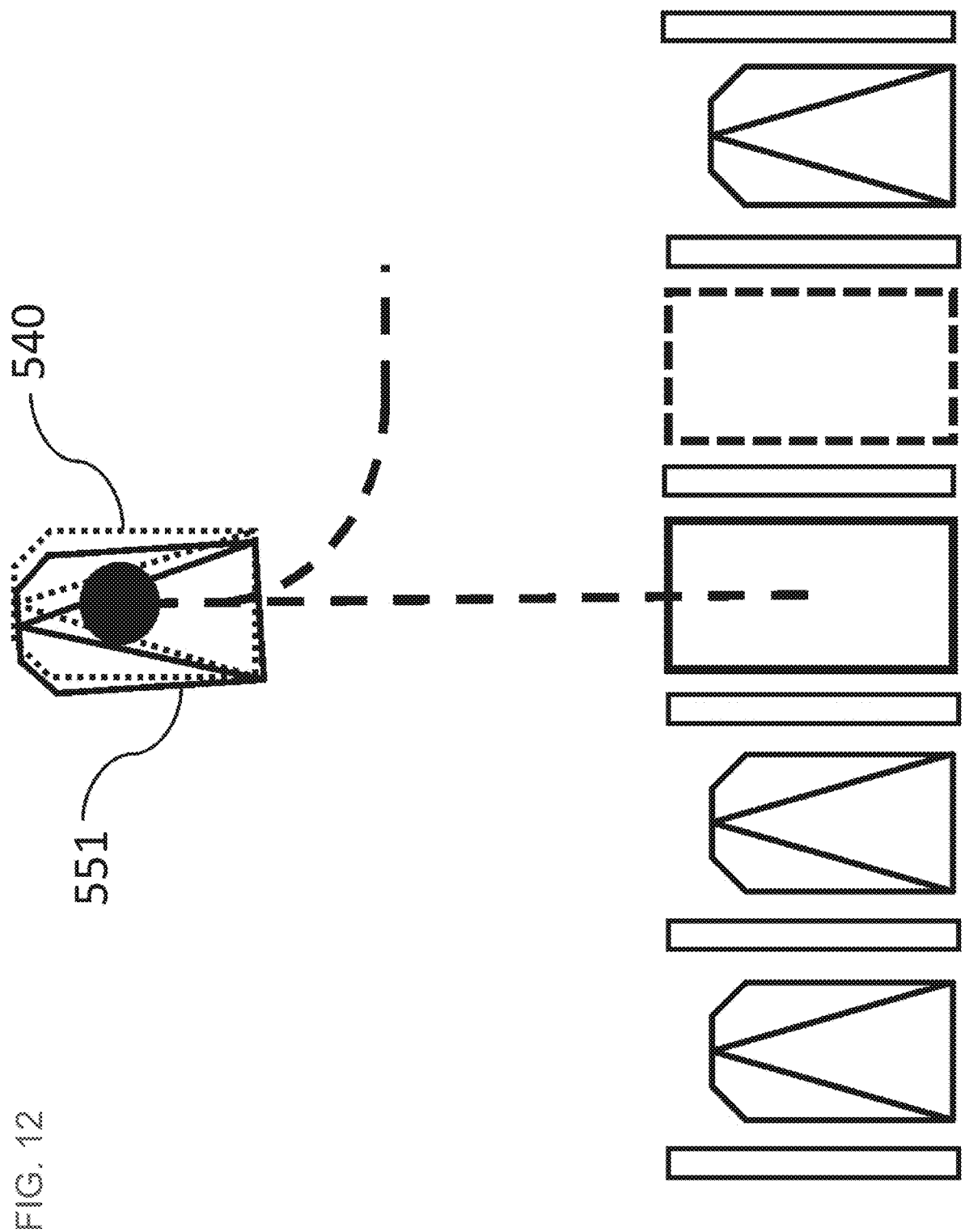
FIG. 12 is a diagram illustrating a parking scene where an error at the relay spot is equal to or smaller than a threshold value.

FIG. 12 illustrates an example of a parking scene where each error at the relay spot with respect to the corrected position and posture of the driver's own vehicle is determined as being equal to or smaller than the threshold value in step 470. In the parking scene in FIG. 12, a deviation between the assumed position 540 which is set in step 400 and the actual position 551 of the driver's own vehicle at the relay spot is small. Therefore, in step 470, each error at the relay spot with respect to the corrected position and posture of the driver's own vehicle is determined to be equal or smaller than the threshold value.

On the other hand, if at least one of the errors at the relay spot with respect to the corrected position and posture of the driver's own vehicle which are calculated in step 460 is equal to or larger than the threshold value, the route regeneration judgment unit 16 determines in step 470 that the corrected position of the driver's own vehicle is not appropriate and there is a high possibility that the automatic parking would fail by continuing to use it; and, therefore, the route regeneration judgment unit 16 determines to regenerate the parking route and returns to step 400. In this case, with the automatic parking system 50, the parking route is regenerated in step 400 and subsequently the driver's own vehicle is made to move autonomously along the regenerated parking route.

Figure 13:
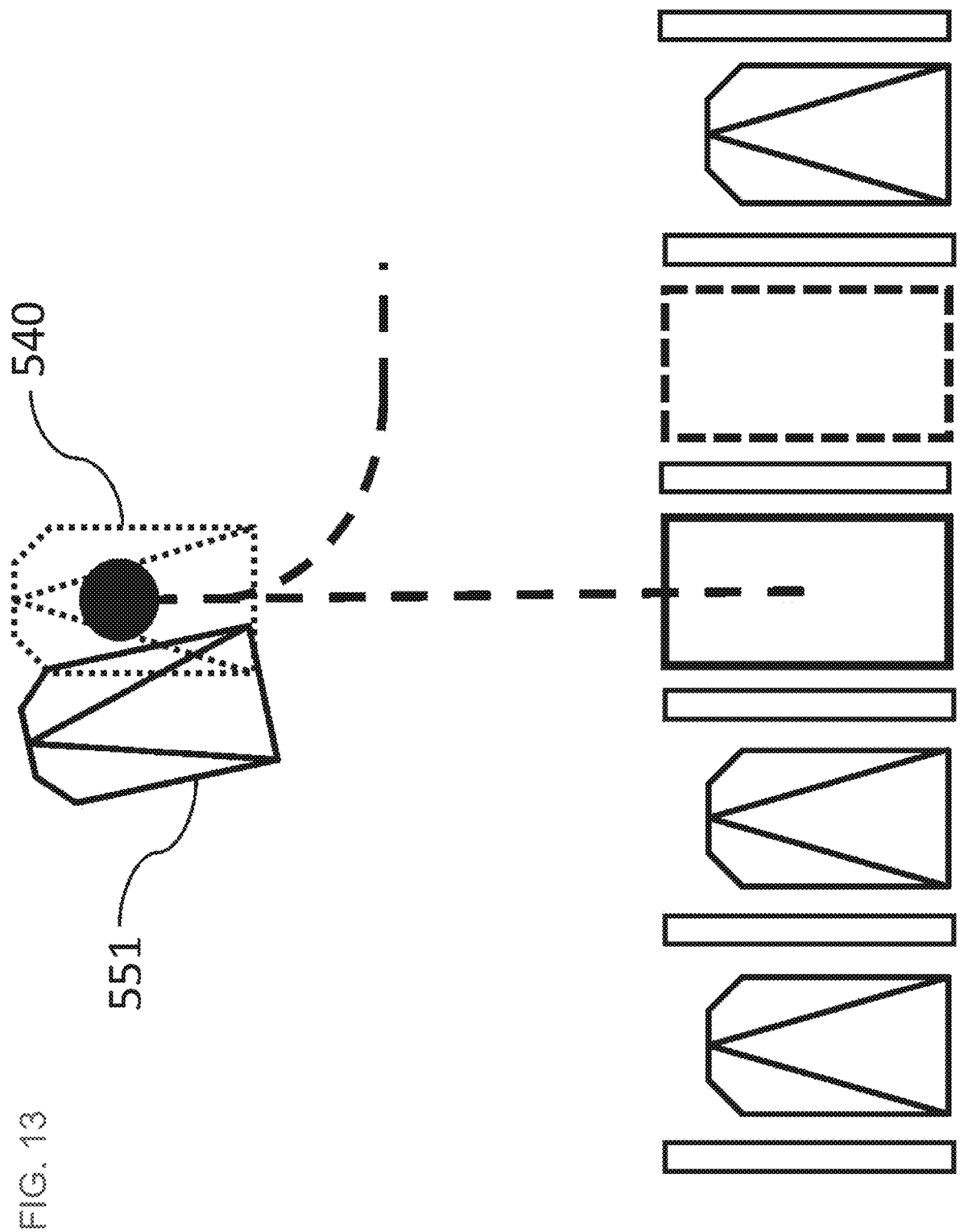
FIG. 13 is a diagram illustrating a parking scene where the error at the relay spot is equal to or larger than the threshold value.

FIG. 13 illustrates an example of a parking scene where in step 470 at least one of the errors at the relay spot with respect to the corrected position and posture of the driver's own vehicle is determined to be equal to or larger than the threshold value. In the parking scene in FIG. 13, the deviation between the assumed position 540 which is set in step 400 and the actual position 551 of the driver's own vehicle at the relay spot is large. Therefore, in step 470, it is determined that the error at the relay spot with respect to the corrected position and posture of the driver's own vehicle is equal to or larger than the threshold value.

Figure 14:
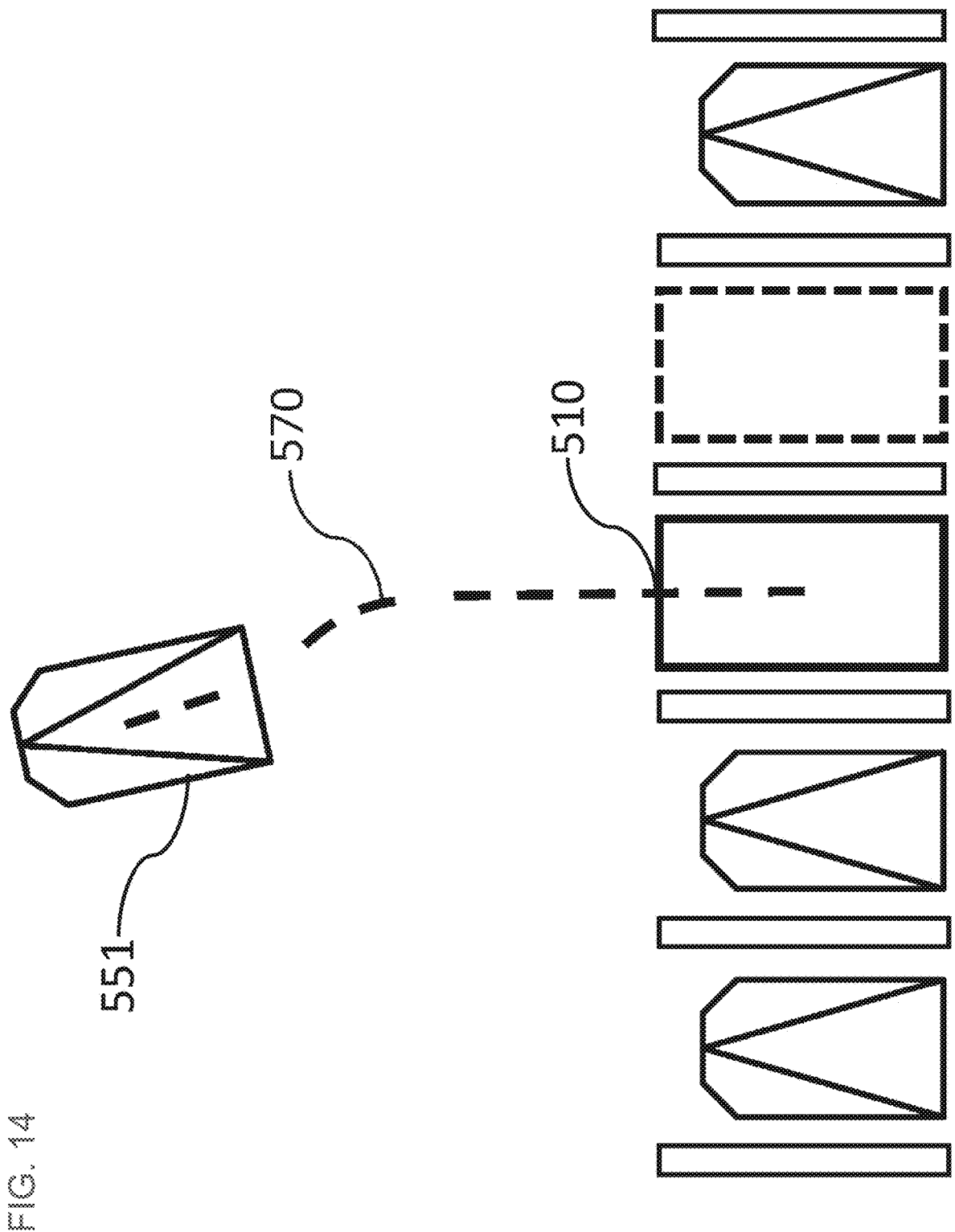
FIG. 14 is a diagram illustrating a parking scene where the parking route is regenerated.

FIG. 14 illustrates an example of a parking scene where the parking route is regenerated. In the parking scene in FIG. 14, a new parking route 570 is regenerated between the position 551 of the driver's own vehicle, regarding which it is determined that the error with the assumed position 540 in FIG. 13 is equal to or larger than the threshold value, and the parking position 510.

Next, the image information accumulation processing executed in step 430 in FIG. 3 will be explained below with reference to the flowchart in FIG. 4.

In step 200, the image information calculation unit 11 reads the captured images 20 which are captured by the image capturing unit. These captured images 20 should preferably be, for example, wide-angle images captured by a fish-eye camera; however, they are not limited to this example.

In step 201, the image information calculation unit 11 extracts the image feature points from the captured images 20 which are read in step 200. In this embodiment, for example, the image feature points are extracted by a well-known processing method called ORB (Oriented FAST and Rotated BRIEF). Incidentally, other processing methods, for example, corner point extraction methods without descriptions of feature amounts such as Harris Corner Detection, Tomasi, and FAST (Features from Accelerated Segment Test), or feature points extraction methods such as SURF and SIFT may be used and there are no limitations to the processing methods.

In step 202, the image information calculation unit 11 associates the image feature points, which are extracted in step 201, with each other Under this circumstance, the image feature points which have captured images of the same part of the same subject, from among the image feature points extracted respectively from a plurality of captured images obtained in chronological order, are associated with each other. This association is conducted by, for example, comparison of feature amounts of the image feature points or comparison of pixel values around the image feature points. For example, in the case of the ORB used to extract the image feature points in this embodiment, the comparison of the feature amounts of the image feature points is performed by calculating an exclusive OR of the feature amounts which are described in binary; and the smaller that difference is, the higher the possibility becomes that the feature points may have captured the images of the same part of the same subject. Moreover, in the case of corner points detected by the method such as Harris without the feature amounts, the image feature points can be associated with each other by comparing surrounding pixels of the image feature points by means of, for example, SSD (Sum of Squared Difference) and KLT (Kanade-Lucas-Tomasi Feature Tracker) methods.

Incidentally, in this embodiment, when associating the image feature points with each other in step 202, it is preferable that two image feature points in other images should be associated with one image feature point in a certain captured image. Regarding the bundle adjustment performed during the self-position correction processing which is executed by the position correction unit 15 and described later, it is known that a more stable result can be obtained with a larger number of three-dimensional image features. Therefore, associating two image feature points with one image feature point will lead to an increase of the number of the three-dimensional image feature points later when association with the three-dimensional image feature points is performed later in step 206 and when the three-dimensional image feature points are estimated in the subsequent step 207. As a result, this will contribute to enhancement of the accuracy and stability of the bundle adjustment Incidentally, the number of the image feature points associated with one image feature point in step 202 is not limited to two and any arbitrary number may be used as long as that number is more than one. Alternatively, one image feature point may be associated with one image feature point.

Moreover, when associating the image feature points with each other in step 202, the association result regarding an image feature point which is mistakenly associated may be removed. For example, whether the result of associating the image feature points with each other is correct or not can be checked by a publicly-known method called a crosscheck. Any detailed explanation is omitted; however, assuming that two captured images regarding which the image feature points are associated with each other are defined as image A and image B this method is to compare the result of associating one image A with the other image B with the result of associating the image B with the image A; and, if a common result is obtained, adopt this as the result of associating the image feature points with each other.

In step 203, the image information calculation unit 11 corrects any distortions of the image feature points associated in step 202. Generally, lens distortions caused by an optical system of the camera occur in images captured by the image capturing unit configured by using the camera. Therefore, in step 203, processing for removing the lens distortions is executed on the associated image feature points. Incidentally, the processing for removing the lens distortions is executed on the image feature points here; however, the processing for removing the lens distortions may be executed on the captured images 20 which are read in step 200 in order to make it easier to extract the image feature points in step 201. Moreover, if the lens distortions are small, the processing in step 203 may be omitted.

In step 204, the travel amount calculation unit 12 reads the vehicle information 30 from the driver's own vehicle. The vehicle information 30 which is read here is, for example, information about movements of the driver's own vehicle such as the vehicle speed, the steering wheel angle, and the shift brake condition as mentioned earlier and can be obtained from the driver's own vehicle.

In step 205, the travel amount calculation unit 12 estimates the travel amount of the driver's own vehicle from the vehicle information 30 which has been read in step 204. Under this circumstance, $z_{car}$, $\theta_{roll}$, and $\theta_{patch}$ from among six variables representing the rotation amount and the translational motion amount of the driver's own vehicle indicated the aforementioned Expression (1) cannot be estimated from the vehicle speed and the steering wheel angle which are indicated by the vehicle information 30, so that these values are set as 0. The position of the driver's own vehicle can be estimated by adding up the thus-estimated travel amount of the driver's own vehicle. Moreover, assuming that regarding the rotation amount and the translational motion amount of the image capturing unit indicated in the aforementioned Expression (2), which are calculated based on a mounting position of the camera in the vehicle, a transformation matrix between the vehicle coordinate system and the camera coordinate system is already known, the travel amount in the camera coordinate system of the image capturing unit, which is required for subsequent processing, is calculated by coordinate transformation from the rotation amount and the translational motion amount of the driver's own vehicle by using the above-described transformation matrix.

In step 206, the three-dimensional image feature point calculation unit 14 associates the image feature points with the estimated three-dimensional image feature points on the basis of the result of associating the image feature points with each other in step 202. Under this circumstance, if any of the image feature points extracted in step 201 regarding which its three-dimensional image feature point is already associated with the estimated image feature point as a result of step 207 described later and executed in the past, the relevant image feature point is associated with that three-dimensional image feature point. Consequently, regarding the relevant image feature point, the estimation of the three-dimensional image feature point is not performed in step 207 and the three-dimensional image feature point which has already been estimated is treated as indicating the three-dimensional position of the relevant image feature point in the real space. This processing will lead to an increase of constraint conditions for each three-dimensional image feature point and thereby has the advantageous effect of enhancing the accuracy in the position correction using the bundle adjustment described later.

Figure 17:
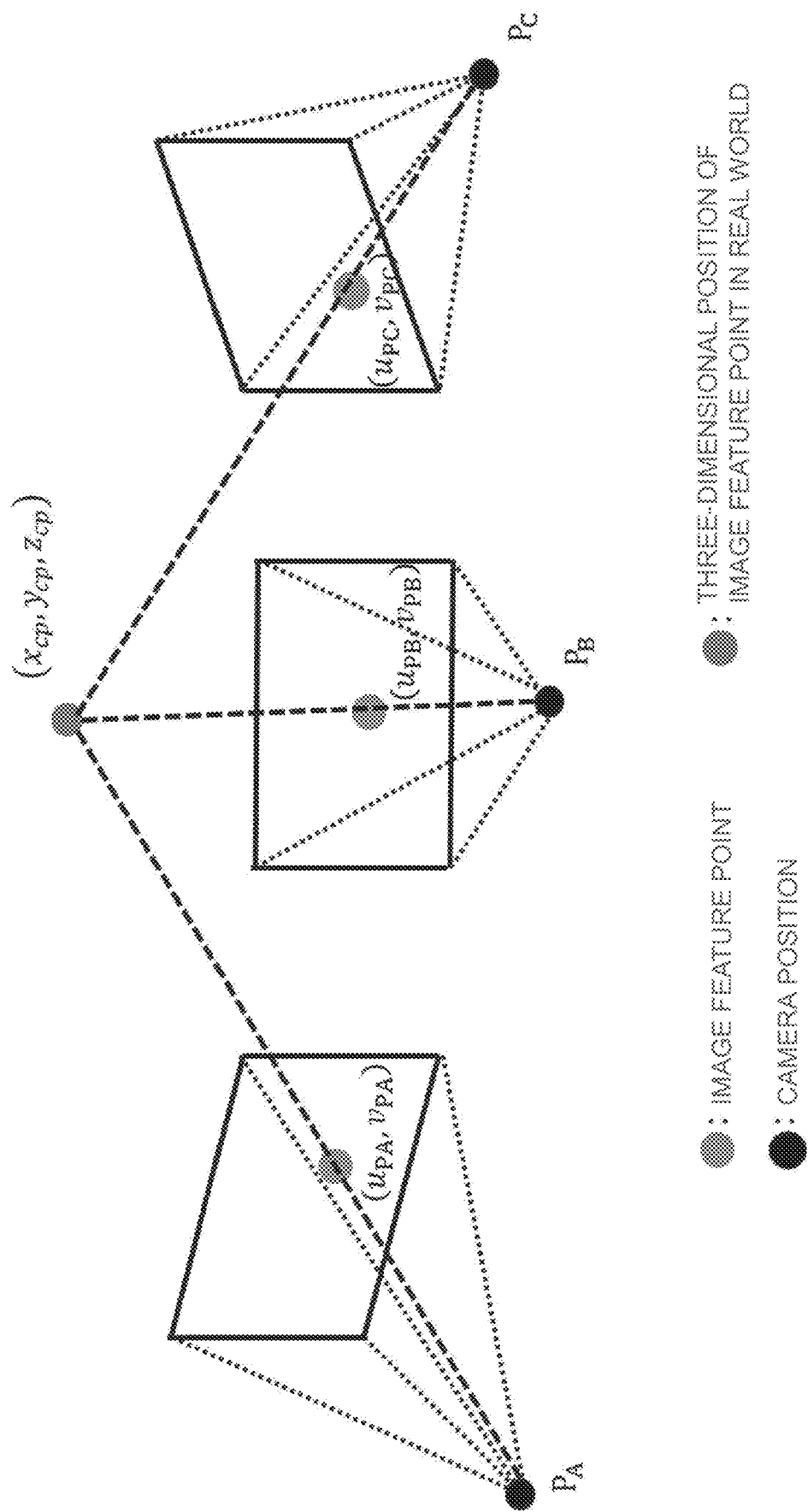
FIG. 17 is a diagram for explaining association between image feature points and a three-dimensional image feature point which has been estimated.

The above-described processing in step 206 will be further explained with reference to a specific example in FIG. 17. In the example in FIG. 17, it is assumed that an image feature point ($u_{P4}$, $v_{P4}$) in a captured image obtained at a camera position $P_A$ and an image feature point ($u_{PB}$, $v_{PB}$) in a captured image obtained at a camera position $P_B$ are associated with other and a three-dimensional image feature point ($X_{cp}$, $Y_{cp}$, $Z_{cp}$) has already been estimated from these image feature points Under this circumstance, the three-dimensional image feature point indicates the position of the image feature point in the real space. Under this situation, it is assumed that an image feature point ($u_{PC}$, $v_{PC}$) is newly extracted from a captured image obtained at a camera position $P_C$ and this image feature point is associated with the image feature point $(u_{PA}, v_{PA})$ or the image feature point $(u_{PB}, v_{PB})$ In such a case, in step 206, the three-dimensional image feature point $(X_{cp}, Y_{cp}, Z_{cp})$ is treated as if it is estimated from the above-mentioned three image feature points, by associating the image feature point $(u_{PC}, v_{PC})$ with the three-dimensional image feature point $(X_{cp}, Y_{cp}, Z_{cp})$. Consequently, in the subsequent step 207, the three-dimensional image feature point will not be calculated from the image feature point $(u_{PC}, v_{PC})$. Incidentally, the example in FIG. 17 shows that the three image feature points are associated with one three-dimensional image feature point $(X_{cp}, Y_{cp}, Z_{cp})$; however, the number of the image feature points associated with the three-dimensional image feature point is not particularly limited.

In step 207, the three-dimensional image feature point calculation unit 14 estimates a three-dimensional image feature point(s) with respect to the image feature points associated in step 202 on the basis of the travel amount of the driver's own vehicle which is estimated in step 205. Under this circumstance, the three-dimensional image feature point(s) is estimated by finding the position in the real space in a triangulation manner on the basis of the positions of the mutually-associated image feature points in their respective captured images 20 and the camera positions when the respective captured images 20 were captured. Incidentally, the image feature points which are targeted here are limited to those which are not associated with the three-dimensional image feature point in step 206.

Figure 18:
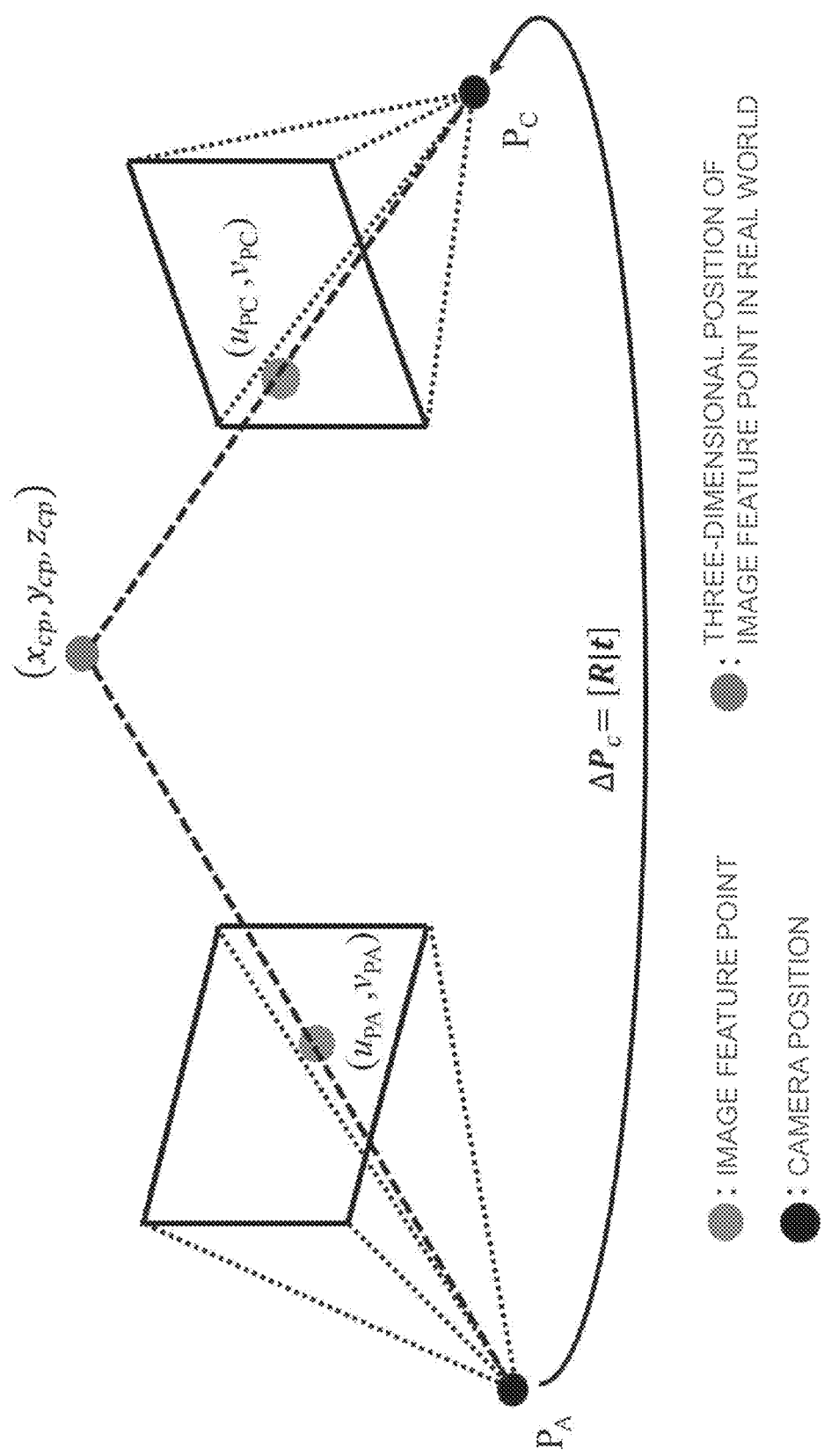
FIG. 18 is a diagram for explaining estimation of the three-dimensional image feature points with respect to the image feature points.

The above-described processing in step 207 will be further explained with reference to a specific example of FIG. 18. The example of FIG. 18 shows that the image feature point $(u_{PA}, v_{PA})$ in the captured image obtained at the camera position $P_A$ and the image feature point $(u_{PC}, v_{PC})$ in the captured image obtained at the camera position $P_C$ are associated with each other and the three-dimensional image feature point $(X_{cp}, Y_{cp}, Z_{cp})$ is estimated from these camera positions and image feature points Incidentally, the camera position $P_C$ is found from a travel amount $\Delta P_c$ of the image capturing unit in the camera coordinates, which is calculated by performing the coordinate transformation of the travel amount of the driver's own vehicle which is estimated in step 205.

In step 208, the three-dimensional image feature point calculation unit 14 deletes the three-dimensional image feature points with low reliability from among the three-dimensional image feature points estimated in step 207. Under this circumstance, the three-dimensional image feature point calculation unit 14 calculates a position error (reprojection error) between the position of each estimated three-dimensional image feature point in the relevant captured image when reprojected onto any one of the original captured images 20, and the original image feature point extracted from the relevant captured image 20. Then, the three-dimensional image feature point calculation unit 14, determines the reliability of each three-dimensional image feature point by recognizing, on the basis of the calculated position error, that the larger the position error is, the lower the reliability of that three-dimensional image feature point is, and deletes the three-dimensional image feature point(s) whose reliability is equal to or smaller than a specified value. Consequently, with the bundle adjustment performed when the position correction unit 15 executes the self-position correction processing described later, the position of the driver's own vehicle is corrected by excluding the three-dimensional image feature points with low reliability.

Figure 19:
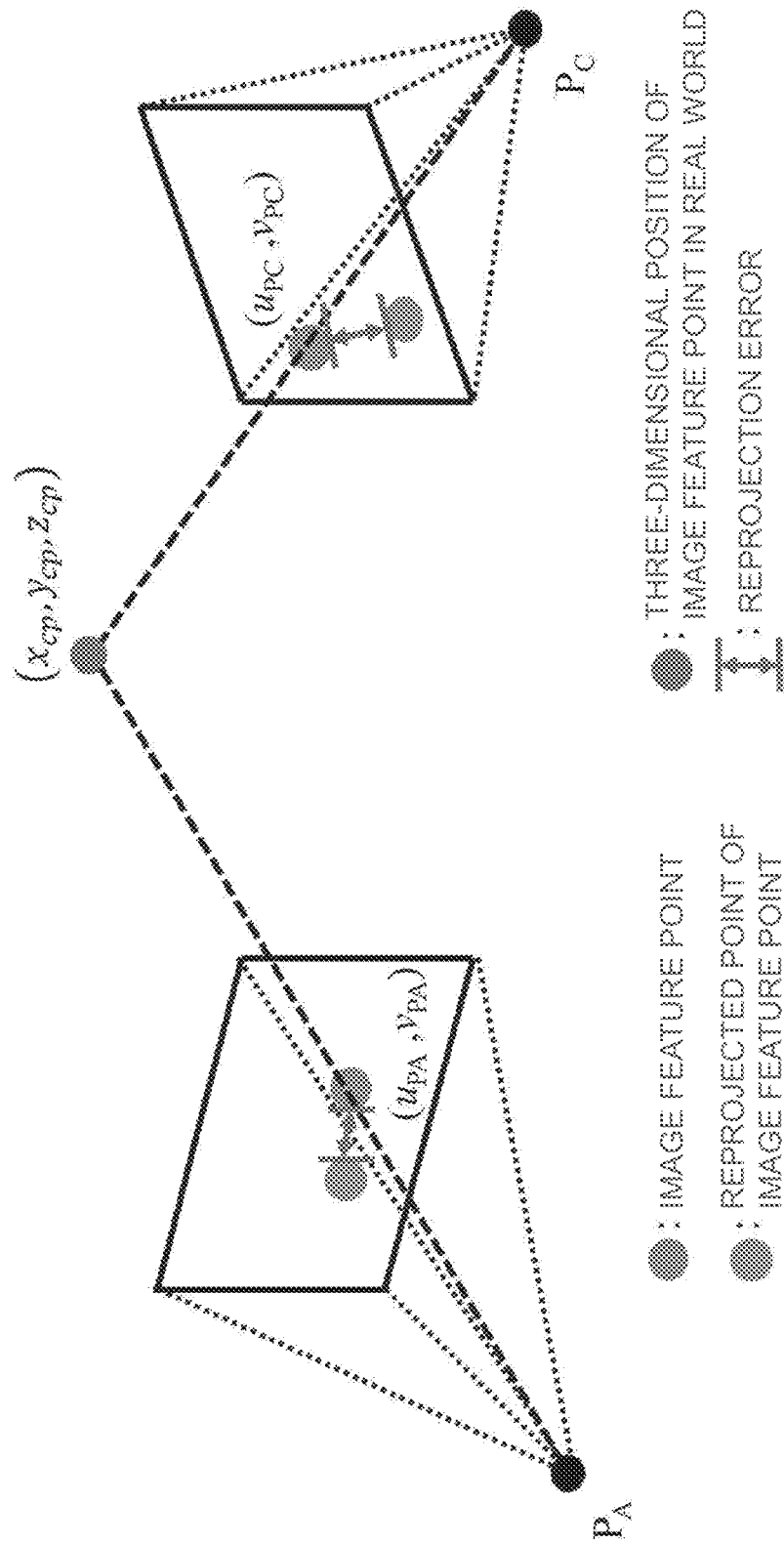
FIG. 19 is a diagram for explaining calculation of reprojection errors by the three-dimensional image feature points.

The above-described processing in step 208 will be further explained with reference to a specific example of FIG. 19. The example in FIG. 19 shows that the reliability of the three-dimensional image feature point $(X_{cp}, Y_{cp}, Z_{cp})$ is calculated from position errors (reprojection errors) between the positions of the respective reprojection points when the three-dimensional image feature point $(X_{cp}, Y_{cp}, Z_{cp})$ is reprojected onto the captured images obtained respectively at the camera positions $P_A$, $P_C$, and the original image feature points $(u_{PA}, V_{PA}), (u_{PC}, v_{PC})$ in these captured images. Incidentally, the reliability of this three-dimensional image feature point may be calculated from both the captured image at the camera position $P_A$ and the captured image at the camera position $P_C$ or from only either one of them.

The position error (reprojection error) $E_{reprojection}$ in FIG. 19 can be calculated according to Expression (13) below. In Expression (13), $U_p$ and $V_p$ represent the position of the original image feature point in each captured image and $X_{cp}$, $Y_{cp}$, and $Z_{cp}$ represent the position of the three-dimensional image feature point, that is, the position of the image feature point in the real space. Moreover, f represents a focal point distance of the camera used for the image capturing unit. In step 208, the three-dimensional image feature point whose reprojection error $E_{reprojection}$ calculated according to Expression (13) is larger than a specified threshold value is deleted as the three-dimensional image feature point with low reliability.

[Math. 4]

$$E_{reprojection} = \sqrt{(u_p - fx_{cp}/z_{cp})^2 + (v_p - fy_{cp}/z_{cp})^2} \quad (13)$$

Incidentally, in this embodiment, the three-dimensional image feature point with low reliability is deleted on the basis of the reprojection error as described above; however, the three-dimensional image feature point with low reliability may be deleted by using other methods. For example, a three-dimensional image feature point generated from the image feature points from which sufficient parallax is not obtained generally makes the position accuracy become low, so that such three-dimensional image feature point can be deleted as the three-dimensional image feature point with low reliability. Moreover, there are publicly known methods other than the above-described method and these other methods may be used.

In step 209, the image information obtained in each processing described above is registered in the position estimation apparatus 10. The image information which is registered here includes: the image feature points extracted in step 201, the results of associating the image feature points with each other in step 202; the image feature points after the correction of the distortions in step 203; the results of associating the image feature points with the three-dimensional image feature points in step 206; and the estimation results of the three-dimensional image feature points by excluding those removed in step 208 from among the three-dimensional image feature points estimated in step 207. In step 209, the position estimation apparatus 10 makes these pieces of information available for the subsequent processing by storing them in a storage medium such as a RAM or a hard disk.

In step 210, the self-position information, that is, the position of the driver's own vehicle information which is found from the travel amount estimated in step 205 is registered in the position estimation apparatus 10. The self-position information which is registered here is the position and posture of the driver's own vehicle and the position and posture of the image capturing unit which are indicated with the six degrees of freedom according to the aforementioned Expressions (1) and (2) Also in step 210 in the same manner as step 209, the self-position information is made available for the subsequent processing by storing it in a storage medium such as a RAM or a hard disk.

In step 430 in FIG. 3, the above-explained image information accumulation processing is executed.

Next, the self-position correction processing executed in step 450 in FIG. 3 will be explained with reference to the flowchart in FIG. 5.

In step 300, the position correction unit 15 reads the image information registered in step 209 in FIG. 4. Under this circumstance, the position correction unit 15 reads, as the image information, information such as the image feature points extracted respectively from the plurality of captured images 20, which are sequentially captured by the image capturing unit, and the three-dimensional image feature points indicating the three-dimensional positions of the image feature points in the real space incidentally, regarding the image feature points, two or more image feature points exist for one three-dimensional image feature point as mentioned earlier.

In step 310, the position correction unit 15 reads the self-position information registered in step 210 in FIG. 4. Under this circumstance, the position and posture of the image capturing unit corresponding to each three-dimensional image feature point is read as the self-position information.

In step 320, the position correction unit 15 executes the self-position correction processing for correcting the position of the driver's own vehicle, which has been estimated so far, by using the information which is read in steps 300 and 310, respectively. Under this circumstance, the position correction unit 15 calculates a position error between each position of an image feature point indicated by each three-dimensional image feature point in the real space, when the three-dimensional position is reprojected onto any one of the captured images 20, and each image feature point extracted from the relevant captured image 20 with respect to those which are associated with each other. Then, the position correction unit 15, repeatedly corrects each three-dimensional image feature point and the position of the driver's own vehicle so that the total of the position errors becomes minimum; and outputs these correction results which are finally obtained, as the results of the self-position correction processing.

The above-described self-position correction processing can be implemented by a publicly known method, for example, the bundle adjustment Any detailed explanation about it is omitted; however, the bundle adjustment is a method which is used when solving a problem to estimate parameters for a geometric model from the correspondence relationship between the image feature points extracted between multiple images and which solves a nonlinear optimization problem in terms of numerical values. It is known that initial values and an evaluation function are important to solve the nonlinear optimization problem. In this embodiment, the self-position correction processing in step 320 is treated as a nonlinear least squares problem by using, as the evaluation function, a total value of the reprojection errors when a plurality of three-dimensional image feature points are reprojected onto the captured images 20. Specifically speaking, the self-position correction processing in step 320 is executed by: estimating the position and posture of the image capturing unit so that the total value $E_{sum}$ of the reprojection errors calculated according to Evaluation Expression (14) below becomes minimum; and calculating the corrected position of the driver's own vehicle from the estimation result Incidentally, the position and posture of the image capturing unit which are estimated here are expressed with the six degrees of freedom as explained earlier.

[Math. 5]

$$E_{sum} = \Sigma_p \{(u_p - fx_{cp}/z_{cp})^2 + (v_p - fy_{cp}/z_{cp})^2\} \quad (14)$$

The initial values of Evaluation Expression (14) are the positions of each three-dimensional image feature point and each image feature point which have been found before and during the previous processing and these values are set from the image information which is read in step 300. Moreover, with the position estimation apparatus 10 in this embodiment, the position and posture of the image capturing unit changes with the six degrees of freedom with the elapse of time, the captured images 20 are newly obtained, and the three-dimensional image feature points are found from there. Therefore, the number of parameters to be optimized by the self-position correction processing in step 320 is the number of three-dimensional image feature points×3+the number of captured images×6. Therefore, it is not realistic to execute the self-position correction processing by using all the image information and the positions and postures of the image capturing unit which have been obtained from the start of the automatic parking, because the number of parameters would increase unlimitedly. So, in this embodiment, it is preferable that the number of the captured images 20 used in the self-position correction processing should be limited and the image information and the positions and postures of the image capturing unit corresponding to such captured images 20 should be used. For example, the self-position correction processing can be executed by using the image information corresponding to the last 20 images and the positions and postures of the image capturing unit at the respective spots corresponding to the above-described image information.

Moreover, in order to find a unique optimum solution in the bundle adjustment, it is necessary to fix some of the three-dimensional image feature points or some of the positions and postures of the image capturing unit as constants Therefore, in this embodiment, the three-dimensional image feature points and the position of the driver's own vehicle should preferably be corrected by performing local bundle adjustment by which the position of the driver's own vehicle corresponding to a specified number of captured images 20 is fixed. For example, the local bundle adjustment can be performed by fixing the position of the driver's own vehicle corresponding to 10 images and fixing, as constants, the positions and postures of the image capturing unit corresponding to them. Under this circumstance, some of the positions and postures of the image capturing unit, but not the three-dimensional image feature points, are set as fixed values because it is empirically known that the estimated positions and postures would be less dispersed than the case where some of the three-dimensional image feature points are fixed. Furthermore, in this embodiment, the position and posture of the image capturing unit are estimated from the estimation result of the travel amount of the driver's own vehicle by means of the dead reckoning, so that it is also possible to solve the scale drift problem by setting some of the positions and postures of the image capturing unit as fixed values.

If the corrected position of the driver's own vehicle is calculated successfully by the self-position correction processing in step 320, the position correction unit 15 updates the accumulated image information and the self-position information, respectively, in steps 330 and 340 on the basis of the above-mentioned calculation result and the three-dimensional image feature point and the position and posture of the image capturing unit when such calculation result is obtained.

In step 450 in FIG. 3, the above-explained self-position correction processing is executed.

According to one embodiment of the present invention described above, the following operational advantages are obtained.

(1) The position estimation apparatus 10 estimates the position of the driver's own vehicle which is a mobile object moving along a preset route. The position estimation apparatus 10 includes the image information calculation unit 11, the travel amount calculation unit 12, the three-dimensional image feature point calculation unit 14, the position correction unit 15, and the route regeneration judgment unit 16. The image information calculation unit 11: extracts each of image feature points from a plurality of images which are sequentially captured by the image capturing unit mounted in the driver's own vehicle (step 201); and associates the image features points with each other between the plurality of images (step 202). The travel amount calculation unit 12 estimates the position of the driver's own vehicle by calculating a travel amount of the driver's own vehicle (step 205). The three-dimensional image feature point calculation unit 14 estimates the three-dimensional image feature point indicating the three-dimensional position of the image feature point in the real space on the basis of the result of associating the image feature points with each other between the plurality of images by the processing of the image information calculation unit 11 in step 202 and the position of the driver's own vehicle which is estimated by the travel amount calculation unit 12 in step 205 (step 207) The position correction unit 15 calculates a position error between a position of the three-dimensional position, when the three-dimensional position is reprojected onto any one of the plurality of images, in the relevant image and the image feature point extracted from the relevant image and corrects the positions of the three-dimensional image feature point and the driver's own vehicle so as to reduce the position error (step 320). The route regeneration judgment unit 16 compares the position of the mobile object corrected by the position correction unit 15 with the route (step 460) and judges whether or not to regenerate the route on the basis of the result of this comparison (step 470). Consequently, it is possible to enhance the accuracy in estimating the position of the driver's own vehicle which is the mobile object moving autonomously along the route.

(2) The position estimation apparatus 10 includes the position-in-route judgement unit 13 that judges whether or not the driver's own vehicle has reached a relay spot which is preset on the route. If the position-in-route judgement unit 13 determines that the driver's own vehicle has reached the relay spot (step 440: Yes), the position correction unit 15 corrects the position of the driver's own vehicle by executing the self-position correction processing in step 450. Consequently, when the driver's own vehicle is moving autonomously along the route, it is possible to correct the position of the driver's own vehicle at an appropriate timing.

(3) The route regeneration judgment unit 16 calculates differences between the position and posture of the driver's own vehicle corrected by the position correction unit 15 and the position and posture of the driver's own vehicle, which are preset with respect to the spot, in step 460. In step 470, the route regeneration judgment unit 16 judges whether or not to regenerate the parking route on the basis of each difference calculated in step 460. Consequently, if the corrected position of the driver's own vehicle is not appropriate and there is a high possibility that the automatic parking would fail by continuing to use such corrected position of the driver's own vehicle, it is possible to ensure that the automatic parking would be successful by regenerating the parking route.

(4) The three-dimensional image feature point calculation unit 14 judges reliability of the three-dimensional image feature point on the basis of a position error between a position of the three-dimensional image feature point, when it is reprojected on any one of the plurality of images, in the relevant image and the image feature point extracted from the relevant image (step 208) Since this this three-dimensional image feature point of low reliability is excluded in step 208, the position correction unit 15 calculates the position error in step 320 by excluding the three-dimensional image feature point which is determined by the three-dimensional image feature point calculation unit 14 that its reliability is low. Consequently, the position correction unit 15 can calculate the position error appropriately when correcting the positions of the three-dimensional image feature point and the driver's own vehicle.

(5) When associating the image feature points with each other between the plurality of images in step 202, the image information calculation unit 11 should preferably associate one image feature point in one of two images included in the plurality of images with a plurality of the image feature points in the other image Consequently, the position correction unit 15 can correct the positions of the three-dimensional image feature point and the driver's own vehicle with good accuracy.

(6) In step 320, the position correction unit 15 should preferably correct the positions of the three-dimensional image feature point and the driver's own vehicle by performing local bundle adjustment by fixing the position of the driver's own vehicle corresponding to a specified number of images from among the plurality of images Consequently, it becomes possible to uniquely find an optimum solution as the correction result of the positions of the three-dimensional image feature point and the driver's own vehicle.

(7) Regarding an image feature point associated with an image feature point for which the three-dimensional image feature point has already been estimated, the three-dimensional image feature point calculation unit 14 does not estimate the three-dimensional image feature point, but sets the estimated three-dimensional image feature point as a three-dimensional image feature point for the above-mentioned image feature point (step 206). Consequently, it is possible to reduce the processing load and also enhance the correction accuracy when the position correction unit 15 corrects the positions of the three-dimensional image feature point and the driver's own vehicle.

(8) The route where the driver's own vehicle moves autonomously is designed as a parking route to a designated parking position, so that the automatic parking can be realized by using the position estimation apparatus 10.

(9) The position estimation apparatus 10 is coupled to the automatic parking system 50 that generates the parking route and cause the driver's own vehicle to move autonomously to the parking position. If the route regeneration judgment unit 16 determines to regenerate the parking route in step 470, the position estimation apparatus 10 issues an instruction to the automatic parking system 50 to regenerate the parking route. Consequently, it is possible to regenerate the parking route as necessary and make the automatic parking implemented successfully with certainty.

The embodiment of the present invention has been described above; however, the present invention is not limited to the aforementioned embodiment and various changes can be made without departing from the scope stated in the scope of claims. For example, in the aforementioned embodiment, the position estimation apparatus 10 which is combined with the automatic parking system 50 and executes the automatic parking is explained; however, the present invention can also be applied to a position estimation apparatus which is used in other systems. Furthermore, the aforementioned embodiment has explained the present invention in detail; however, it does not necessarily have to include all the explained configurations. Furthermore, it is also possible to add the configuration of another embodiment to the configuration. Additionally, an addition, deletion, or replacement can be performed with respect to part of the configuration.

The above-described embodiments and variations are just examples and the present invention is not limited to the content of these embodiments and variations unless the features of the invention are impaired. Various embodiments and variations have been described above; however, the present invention is not limited to the content of these embodiments and variations. Other aspects which can be thought of within the scope of the technical idea of the present invention are also included within the scope of the present invention.

The disclosure content of the following basic priority application is incorporated herein by reference. Japanese Patent Application No. 2018-180913 (filed on Sep. 26, 2018).

REFERENCE SIGNS LIST

10: position estimation apparatus
11: image information calculation unit
12: travel amount calculation unit
13: position-in-route judgement unit
14: three-dimensional image feature point calculation unit
15: position correction unit
16: route regeneration judgment unit
20: captured images
30: vehicle information
40: route information
50: automatic parking system

The invention claimed is:

1. A position estimation apparatus for estimating a position of a mobile object moving along a preset route, the position estimation apparatus comprising:
an image information calculation unit configured to extract each of image feature points from a plurality of images which are sequentially captured from a specified spot by an image capturing unit mounted in the mobile object and associate the image feature points with each other between the plurality of images;
a travel amount calculation unit configured to estimate the position of the mobile object by calculating a travel amount of the mobile object from the specified spot on the basis of information about movements of the mobile object;
a three-dimensional image feature point calculation unit configured to estimate a three-dimensional position of the image feature point in a real space on the basis of a result of associating the image feature points with each other between the plurality of images and the position of the mobile object estimated by the travel amount calculation unit;
a position-in-route judgment unit configured to judge whether or not the position of the mobile object which is estimated by the travel amount calculation unit has reached a preset relay spot on the route, the preset relay spot is set on the preset route which is provided to the position estimation apparatus by an automatic parking system;
a position correction unit configured to calculate a position error between a position of the three-dimensional position estimated from an image captured by the image capturing unit, the position of the three-dimensional position being in the relevant image when the three-dimensional position is reprojected onto the relevant image, and the image feature point extracted from the relevant image when the position in-route judgement unit determines that the position of the mobile object has reached the preset relay spot, and correct the position and posture of the mobile object so as to reduce the position error; and
a route regeneration judgment unit configured to calculate differences between the position and posture of the mobile object corrected by the position correction unit and a position and posture of the mobile object which are preset with respect to the preset relay spot, and determine to regenerate the route if at least one of the calculated respective differences is equal to or larger than one of threshold values and determine not to regenerate the route if the calculated respective differences are not equal to or larger than the threshold values,
wherein the preset relay spot is a steering-wheel-turning spot for the mobile object to switch from a forward movement to a reverse movement or from the reverse movement to the forward movement on the route and the route is a parking route to a designated parking position.

2. The position estimation apparatus according to claim 1, wherein the three-dimensional image feature point calculation unit judges reliability of the three-dimensional position on the basis of a position error between a position of the estimated three-dimensional position, when the estimated three-dimensional position is reprojected onto any one of the plurality of images, in the relevant image and the image feature point extracted from the relevant image; and
wherein the position correction unit calculates the position error by excluding the three-dimensional position which is determined by the three-dimensional image feature point calculation unit that the reliability is low.

3. The position estimation apparatus according to claim 1, wherein when associating the image feature points with each other between the plurality of images, the image information calculation unit associates one image feature point in one of two images included in the plurality of images with a plurality of the image feature points in the other image.

4. The position estimation apparatus according to claim 1, wherein the position correction unit corrects the three-dimensional position and the position of the mobile object by performing local bundle adjustment by fixing the position of the mobile object corresponding to a specified number of images from among the plurality of images.

5. The position estimation apparatus according to claim 1, wherein regarding an image feature point associated with an image feature point for which the three-dimensional position has already been estimated, the three-dimensional image feature point calculation unit does not estimate the three-dimensional position, but sets the three-dimensional position, which has already been estimated, as a three-dimensional position for the above-mentioned image feature point.

6. The position estimation apparatus according to claim 1, wherein the position estimation apparatus is coupled to the automatic parking system that generates the parking route and causes the mobile object to move autonomously to the parking position; and wherein if the route regeneration judgment unit determines to regenerate the parking route, the route regeneration judgement unit issues an instruction to the automatic parking system to regenerate the parking route.

* * * * *